United States Patent [19]

Rohwetter et al.

[11] Patent Number: 5,456,169
[45] Date of Patent: Oct. 10, 1995

[54] PROCESS AND APPARATUS FOR PRINTING ON FLAT INDIVIDUAL ARTICLES

[75] Inventors: Norbert Rohwetter, Bünde; Volker Steffen, Herford; Horst Heidenreich, Kirchlengern, all of Germany

[73] Assignee: Werner Kammann Maschinenfabrik GmbH, Bunde, Germany

[21] Appl. No.: 176,554

[22] Filed: Jan. 3, 1994

[30] Foreign Application Priority Data

Aug. 10, 1993 [DE] Germany .................. 43 26 794.7
Sep. 24, 1993 [DE] Germany .................. 43 32 498.3

[51] Int. Cl.⁶ .................. B41F 15/18; B41F 7/16; B41F 17/00
[52] U.S. Cl. .................. 101/35; 101/41; 101/126; 101/129; 101/425; 101/484; 101/217; 101/492
[58] Field of Search .................. 101/35–37, 41–44, 101/115, 126, 129, 175, 185, 217, 218, 247, 425, 474, 484–486, 492; 400/56

[56] References Cited

U.S. PATENT DOCUMENTS

| | | | |
|---|---|---|---|
| 2,105,400 | 1/1938 | Booth | 101/35 |
| 3,898,927 | 8/1975 | Murata et al. | 101/35 |
| 4,193,343 | 3/1980 | Ackley, Sr. et al. | 101/218 |
| 4,698,192 | 10/1987 | Kuze et al. | 101/126 |
| 5,148,742 | 9/1992 | Stirbis et al. | 101/492 |
| 5,158,016 | 10/1992 | Dubuit | 101/115 |
| 5,165,340 | 11/1992 | Karlyn et al. | 101/129 |
| 5,235,913 | 8/1993 | Richardson et al. | 101/425 |
| 5,331,891 | 7/1994 | Sugiyama et al. | 101/425 |

FOREIGN PATENT DOCUMENTS 12757 1/1983 Japan .................. 101/35

*Primary Examiner*—Edgar S. Burr
*Assistant Examiner*—Stephen R. Funk
*Attorney, Agent, or Firm*—Panitch Schwarze Jacobs & Nadel

[57] ABSTRACT

In a process and apparatus for printing on flat individual articles such as CDs by means of offset printing, the surface to be printed upon and the offset printing cylinder which is rolled against the article are adjusted relative to each other to produce a pressure effect which is favorable to transfer of the print image on to the article in order to compensate for differences in thickness between the individual articles. When adjusting the printing cylinder and the surface to be printed upon relative to each other, the radial position of transfer surfaces at the periphery of the printing cylinder may, if necessary, be taken into account. In the absence of an article in the printing station, it is possible to provide a replacement article in the form of a web of material, on to which the print image intended for the missing article is transferred from the printing cylinder. The plate cylinders may also be adjusted relative to the offset printing cylinder in such a way as to permit adaptation to the radial position of the transfer surfaces at the periphery of the printing cylinder.

62 Claims, 9 Drawing Sheets

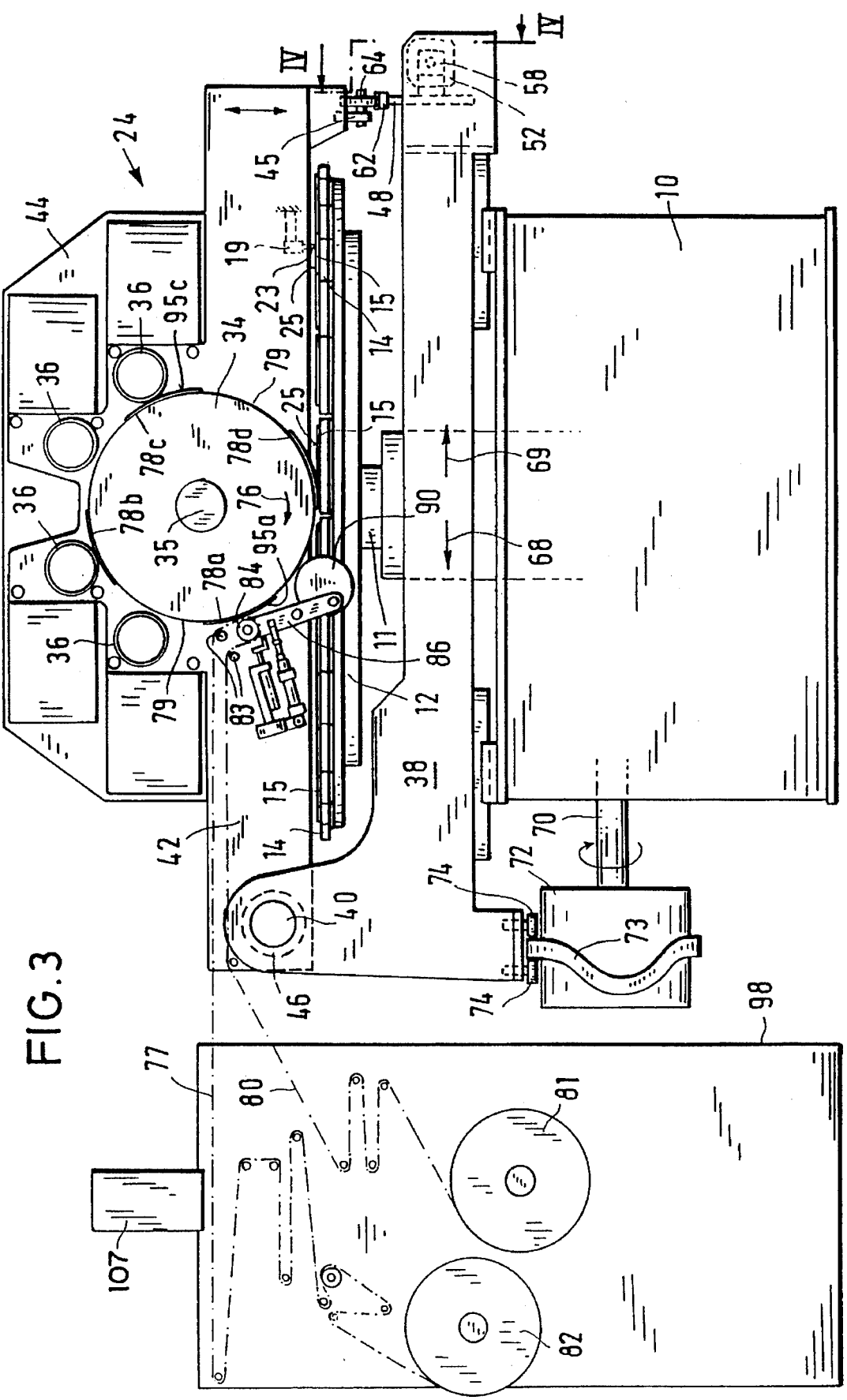

PROCESS AND APPARATUS FOR PRINTING ON FLAT INDIVIDUAL ARTICLES

BACKGROUND OF THE INVENTION

The present invention concerns a process and an apparatus for printing at least once on flat and :possibly relatively inflexible individual articles whose surface to which printing is to be applied is substantially flat.

It will be noted here in this respect that the individual articles are primarily those whose extent perpendicularly to the plane of surface which is to be printed upon is substantially smaller than in the transverse direction thereto. Examples of such articles that may be mentioned are CDs, credit cards, telephone cards, control cards and like articles, in relation to which a high degree of safeguard against forgery is possibly also expected.

It is known for example for CDs to be decorated using a screen printing process. Such a process affords the advantage that the applied layer of printing is comparatively thick, being for example of the order of magnitude of 12μ, so that when using conventional printing inks, good covering and print images are produced, which in a given respect satisfy high levels of requirement in terms of quality. The screen printing process also has the advantage when applying printing to CDs and other articles which have manufacturing tolerances in regard to their thickness that it compensates for such variations in thickness in the printing operation without involving additional steps as the printing stencil through which the printing ink, or another agent, is applied by means of a doctor to the article experiences a certain amount of elastic deformation due to the action of the doctor, and that deformation compensates for the inaccuracies caused by the variations in thickness, in regard to the position of the surface to which the printing is to be applied.

The requirements in regard to nature and quality of the print images on CDs and other individual articles are however becoming ever increasingly severe, in particular in regard to the possible configurations involved with the print image. That applies for example in regard to the reproduction of illustrations with a fairly high degree of detail fidelity, as well as shades of coloring in particular in the case of pictorial representations. The screen printing process generally does not adequately fulfill such requirements, especially as it only permits a relatively coarse screen printing pattern to be produced.

It might see that an offset printing process could be used for printing on individual articles as indicated above as such a process, for example by the use of a print configuration with a high degree of resolution, makes it possible to apply print images with a high level of detail fidelity in a large number of colors and intermediate tones, with the result that the number of colors and color shades in the finished print image can go far beyond the number of basic printing inks used for producing the print image. These are advantages and qualities of the offset printing process, with which any man skilled in the art is familiar and which therefore do not need to be described in greater detail here.

However the use of an offset printing process in relation to CDs and other flat articles which are subject to fluctuations in terms of their thickness hitherto fell foul of the fact that the offset printing process, to achieve good quality of print, requires accurate alignment of the printing or blanket cylinder and therewith the peripheral surface thereof, from which the print image is transferred on to the article to be printed upon, in relation to the article. That is in substance to be attributed to the fact that the application of ink in the offset printing process is substantially thinner than when using a screen printing process and for example is only of the order of magnitude of about 3μ. Particularly when using the above-mentioned pattern printing procedure which makes it possible to achieve the color shades referred to above, the crucial consideration, in terms of the quality of the resulting print image, is that transfer of the print image from the printing cylinder on to the article, in relation to the relative position of the printing cylinder and the article and therewith also in relation to the pressure which is operative between two members, satisfies the conditions which are the optimum conditions in that respect but which hitherto could not be satisfactorily achieved, having regard to the fluctuations in respect of thickness of the individual articles.

It may be noted at this point that an offset printing process is performed using a printing or blanket cylinder, on the cylindrical or peripheral surface of which is disposed a transfer means in the form of a printing blanket which is of a thickness of a few millimeters, for example 3 millimeters, and which generally comprises rubber material. Partial print images are produced by plate cylinders on the outer surface of the transfer means or blanket, that surface acting as a transfer surface. The partial print images are combined on the transfer surface to form an overall print image which is then transferred on to the article to be printed upon, in a single printing operation. The structure of an offset printing mechanism for carrying out that process and the way in which the offset printing process is performed are well known and therefore do not need to be described in further detail here. In regard to the above-indicated problems therefore, to achieve good print quality, the important consideration is essentially that the transfer surface of the transfer means which is generally in the form of a printing blanket is disposed during the printing operation in the optimum position relative to the surface of the article, which is to be printed upon, in order to provide that the print image is transferred from the transfer surface on to the article in a way which guarantees high quality in the finished print image.

SUMMARY OF THE INVENTION

An object of the present invention is to provide a process for printing on individual articles using an offset printing procedure in such a way as to give printing results of high quality at least approaching those achieved by the use of a screen printing process.

Another object of the present invention is to provide a process for printing on individual flat articles which are substantially inflexible or of low flexibility and whose extent perpendicularly to the surface to which the print image is to be applied is frequently substantially less than the extent of the surface to be printed upon, using offset printing, to produce high-quality print images even when the thickness of the individual articles fluctuates within considerable limits.

Still another object of the present invention is to provide a process for printing on CDs and similar substantially inflexible objects with a high degree of print fidelity in a simple and fast operating procedure.

A further object of the present invention is to provide an apparatus for printing on individual generally flat articles using an offset printing procedure, which can afford high-quality printing on the article in a fast operating procedure.

A still further object of the present invention is to provide an apparatus for printing on individual articles whose extent perpendicularly to the surface to which printing is to be applied can be substantially less than the extent of the surface to be printed upon, even when the thickness of the articles fluctuates as due to manufacturing tolerances within considerable limits.

In accordance with the present invention the foregoing and other objects are achieved by a process for printing on individual articles whose extent perpendicularly to a substantially flat surface thereof which is to be printed upon is generally relatively shall, using at least an offset printing process, wherein the position of said surface to be printed upon of the individual article held by a holding means is ascertained. Thereafter, for the printing operation, the offset printing arrangement and said article are adjusted relative to each other so that a transfer surface, for transferring a print image on to said article, of at least one transfer means provided at the periphery of a rotating printing cylinder is brought into an appropriate position for printing relative to the article and then offset printing is effected.

The foregoing and other objects are also attained by an apparatus for carrying out the process of the invention.

As will be seen in greater detail hereinafter therefore the invention provides that prior to the offset printing operation itself the position of the surface of the article to be printed upon is ascertained for example by a sensor device and the rotatably mounted means for applying the print image to the article, which means is referred to hereinafter for the sake of simplicity as the printing cylinder, is adjusted if necessary in relation to the position which the surface to be printed upon occupies. In that way it is possible for each printing operation to afford the optimum relative position as between the surface of the article to be printed upon and the transfer surface of the transfer means disposed on the printing cylinder. The amount of adjustment of the printing cylinder relative to the article will generally be less than 1 mm so that the time available between two successive printing operations is sufficient to effect adjustment of the printing cylinder without a substantial delay in the operating procedure occurring as a result.

In general apparatuses for printing on individual articles of the kind involved here are provided with a transportation means for the articles, which at the same time also carries the at least one holding means for holding the articles during the printing operation relative to the printing cylinder and any further treatment operations to be carried out and during the transportation movement. A transportation means of that kind by which the articles are preferably transported with a stepwise movement can be for example in the form of a table, wheel or like member which is rotatable about a center point in a substantially horizontal plane and which carries the holding means generally adjacent its periphery. It is however also possible to provide other transportation means with which the articles are transported for example by chains or other devices on a substantially linear path through the apparatus and the treatment stations thereof. In order to achieve a high level of productivity it is desirable for the movements of the at least one printing arrangement on the one hand and the transportation movements of the individual articles on the other hand to be matched to each other in the optimum fashion so that the operation of printing on the respective article takes place in the shortest possible time, in which respect that procedure is incorporated into the machine cycle which is possibly also determined by other treatment operations to be carried out on the articles in the apparatus, without substantially increasing the length of the machine cycle.

In accordance with a further feature of the invention it is possible to provide that the transfer means extends only over a portion of the periphery of the printing cylinder so that, during the period of time taken for the cylinder to perform a revolution, with the position of the printing cylinder being otherwise unaltered, the transfer means comes out of engagement with the article or passes out of the region of the path of movement in which the surfaces of the articles to be printed upon move, in the course of the revolution, in the region of the peripheral portion which does not have any transfer means. In that arrangement the transfer means can be subdivided transversely relative to the peripheral direction of the printing cylinder, in which case the resulting parts are at a spacing from each other so that as a result the periphery of the printing cylinder is covered with at least two parts of the transfer means, which are at a spacing from each other in the peripheral direction. In the region of such a part, the printing cylinder, including the said part, is of a larger diameter than where it is without any transfer means. That difference in diameter can be about 4 mm. The number of parts of the transfer means and therewith also the number of spacings between said parts, the lengths of the parts and the spacings in the peripheral direction and the diameter of the printing cylinder as well as the speed of rotation thereof depend on the respective factors involved, for example the length of the print image in the peripheral direction. In general in that respect the situation is such that each part of the transfer means serves to transfer a print image. It is obvious that, after termination of a printing operation, that is to say after the transfer of a print image from a part of the printing blanket on the printing cylinder on to an article, the continually rotating printing cylinder then moves into the region of the respective printing station with a peripheral region of the cylinder, which is of smaller radius relative to the axis of rotation of the printing cylinder than the peripheral portion of the cylinder which bears a part of the printing blanket. Accordingly, following a printing operation, a peripheral portion of the printing cylinder which, by virtue of the smaller radius, is at a spacing from the plane in which the surface of the object to be printed upon is disposed passes into the region of the printing station and the path of transportation movement, whereby the article and the holding means carrying same can be moved out of the printing station by the transportation means, without any need for the printing arrangement to be separately displaced for example in respect of its height for that purpose, that is to say for execution of the transportation movement. As generally the transportation stepping movement which involves removal of a printed article from the printing station simultaneously involves transportation of an article into the printing station for the following printing operation, this operating procedure also means that, by virtue of the above-described design configuration of the printing cylinder, the article to be printed in the following printing operation can be transported into the position for the printing operation without coming into contact with the printing cylinder in the transportation movement. The only requirement for that to occur is for the operating procedure to be controlled in such a way that the distance between the two successive parts of the transfer means, with a given speed of rotation of the printing cylinder, is sufficiently great to be able to perform the transportation operation in the period of time for which the smaller-diameter region of the printing cylinder is disposed in the printing station.

In accordance with a further feature of the invention, during the printing operation the printing cylinder can be displaced or moved laterally relative to the article which is stationary in that situation, in such a way that the printing cylinder with the transfer means, that is to say the respective part of the printing blanket, for the purposes of transferring the print image on to the article, is rolled against the article synchronously, that is to say without any slippage which has a noticeable adverse effect on the quality of the print image. That means that during an operating cycle of the apparatus the printing arrangement executes a to-and-fro movement, in which case during one of the two movements the print image is transferred in the above-described manner, while the other movement serves to move the printing arrangement back into its starting position for the next printing operation. Depending on whether the printing arrangement is reciprocated in parallel relationship with the direction of transportation movement of the articles, as is the case with a linear path of transportation movement of the articles, or in tangential relationship, as is the case when the articles are transported in a circular movement, or in perpendicular or radial relationship with the direction of transportation movement of the articles, the spacings between the individual parts of the transfer means and the speed of rotation of the printing cylinder are to be set and the lateral displacement of the printing cylinder and the transportation stepping movement are to be controlled, in order to be able to carry out the above-described transportation stepping movement in dependence on the position of the parts of the transfer means or the spacings between them.

In accordance with a further feature of the invention it can be provided that a detection operation is effected upstream of the printing station in the direction of transportation movement, to ascertain whether there is an article to be printed upon, in the respective holding means. If that is the case, the printing operation takes place in the intended manner. In the absence of an article, the print image which is disposed on the transfer means, for example the respective part of the printing blanket, is not taken by an article so that that part of the printing blanket would be provided with an additional application of ink on subsequently passing through the plate cylinder stations of the printing arrangement. Then, in the subsequent printing operation, that is to say upon transfer of the print image produced by the double application of ink, that would result in the production on the article of a print image which is clearly different from the other print images produced in the normal fashion, with the consequence that the article printed upon in that way would be waste. In order to prevent that from occurring, the invention can further provide that, in the absence of an individual article in the holding means respectively disposed in the printing station, a replacement article is prepared, which is printed upon and which thus receives the print image intended for the absent article.

Preferably the above-mentioned replacement article is formed by a web of material which is guided over a guide element which can be arranged adjacent the printing cylinder and can be moved between at least two positions. In one of those two positions the guide element with the portion of the web of material associated therewith is disposed outside the region of movement of the at least one transfer surface of the printing cylinder. The absence of an article in the respective holding means can be detected by the same sensor device as that which serves to measure the thickness of the article. In the absence of an article the guide element which can advantageously be in the foam of an impression cylinder is moved with the part of the web of material associated therewith into a position in which the web of material comes into contact with the transfer means, for example a part of the printing blanket, which carries the print image intended for the missing article so that that print image is transferred on to the web of material. After that printing operation, if there is an individual article in the printing station for the following offset printing operation, the guide element is moved back into its starting position again, in which the guide element or the portion of the web of material which is guided therearound does not come into contact with the transfer means of the printing cylinder. The impression cylinder and the portion of the web of material carried thereby can follow the reciprocating movements of the printing arrangement if to apply the print image the offset printing arrangement is displaced relative to the article which remains stationary in that operation.

In accordance with a further feature of the invention the web of material which serves as the replacement article can also be used for breaking in the machine or in test runs thereof, in place of the normal articles. In general it is necessary when changing from one kind of article to another, which generally speaking also involves a change from one print image to another, to interchange the plate cylinders and the plates fixed thereon, and to re-set the entire apparatus and to match the individual steps in the process to each other. That requires the performance of a number of test printing operations before normal production can be begun. It is obvious that, if the articles to be printed upon are comparatively expensive, as in the case for example of CDs, it would be expensive to carry out the test printing operations and the like on the actual articles themselves as in many cases the print images produced during the test runs are not of the required quality. It is here that the present invention affords the option of using the web of material in order on the one hand to be able to produce print images which permit the quality thereof to be evaluated, during the period of time which is required for respectively setting up and adjusting the machine, without on the other hand using for that purpose possibly expensive articles which then either represent waste or would have to cleaned of the printing ink in order to be printed upon again.

In accordance with a further feature of the invention it is possible for the print image which is produced by means of the offset printing process to be disposed on a region of the article which had initially been produced with printing thereon, by virtue of using a screen printing procedure. That may be desirable or even necessary for the reason that the surface of the article to be printed upon is of such a nature and in particular is of a color on which an offset print image will not give the desired effect and in particular will not give the desired aesthetic result, not least because of the very thin layer of ink applied. That can be for example because the offset print image does not have the intended coloration effect, because of the color of the actual article. In that case it may be desirable firstly to produce on the article or on the region thereof to be printed upon, a preferably white basic application of ink to which the offset print image is then applied. The basic application of ink which is preferably produced by a screen printing operation has in particular the advantage that it is always sufficiently thick to completely eliminate the above-mentioned possible disadvantageous effects due to the nature and in particular the color of the article.

It is also possible after application of the offset print image to effect a further step involving the application to that image of a protective layer comprising for example a transparent lacquer or the like, to protect the print image from scratches and other damage. That protective layer is desirably also applied by means of screen printing as it affords the thickness necessary to give the protection effect.

In accordance with a further feature of the invention, when adjusting the relative positions of the offset printing arrangement and the article for the printing operation, the radial position of the transfer surface of the at least one portion of printing blanket along the periphery of the printing cylinder is desirably taken into consideration. It is scarcely possible to ensure that the external surfaces of the portions of printing blanket, which transfer the print images, always extend precisely coaxially relative to the axis of rotation of the printing cylinder, both in their entirety and also each individually. Thus a certain amount of inaccuracy is frequently caused by applying the at least one portion of printing blanket to the periphery of the printing cylinder, as foils which are adhesive on both sides are generally used for that purpose, to provide the joint between the respective portion of printing blanket and the associated peripheral portion of the printing cylinder. However the portion of printing blanket as such may also suffer from such irregularities, for example due to different swelling effects caused by the action of the printing inks thereon. It is also necessary to consider the possibility of individual portions of printing blanket suffering damage and therefore having to be changed. A new portion of printing blanket would probably be of a noticeably different thickness from the other portions of printing blanket which have already been in use for a prolonged period of time and which have generally experienced swelling to a greater or lesser degree, under the influence of the printing ink. As a result of the required degree of accuracy referred to above, in relation to the relative position of the transfer surface on the one hand and an article to be printed upon on the other hand, the influencing factors last discussed above can also result in noticeable impairment of the quality of the print image. For that reason the invention can further provide that such influences are detected and taken into consideration in terms of the relative positioning of the transfer means and the article for a respective printing operation. For the purposes of ascertaining the position and/or the configuration of the transfer surface of the at least one printing blanket portion, it is possible for the impression cylinder for the web of material that serves as the replacement article to be used as a sensing means, without the web of material necessarily having to be present for that purpose. The impression cylinder can be moved into a position in which for example it is urged under the force of a certain amount of resilient prestressing towards the peripheral surface of the printing cylinder until it bears against same. Then, during the rotary movement of the printing cylinder, the impression cylinder detects the precise position and possibly also the configuration in the peripheral direction of the transfer surface of the at least one portion of printing blanket. In that way it is possible to ascertain the position and/or configuration of an individual transfer surface or the array of all transfer surfaces. Those ascertained positions which at the same time also take account of any possible inaccuracies in regard to roundness truth of the printing cylinder can then be detected and fed in the form of signals to a computing means and stored as basic data. The computing means also receives the signals which are outputted by the sensor device for detecting the position of the surface of a respective article to be printed upon, said signals also being processed in a suitable fashion. Those signals and the values stored in the computing means, which take account of the above-mentioned irregularities in the printing arrangement, then give an overall value corresponding to the distance by which the offset printing arrangement has to be adjusted for in each printing operation, for the purpose of proper alignment relative to the article. It will be appreciated that the above-mentioned overall value may also correspond to a distance of zero. It will generally be sufficient for each portion of printing blanket, to ascertain a mean value in respect of the radial position of its transfer surface and to take that value into account when adjusting the printing cylinder. When the situation involves particularly high levels of requirement of quality of printing however it is also possible to adapt the position of the printing cylinder to the respective factors involved during the printing operation which depend on the peripheral configuration of the transfer surface.

Because of the degree of accuracy that is sought, it is desirable for the assembly for relative adjustment of the offset printing arrangement to be in the form of a regulating assembly so that the respective actual position of the printing mechanism is compared to its reference or target position which arises out of the stored or measured parameters, and corrected if necessary.

An operating procedure which has been found particularly advantageous is one in which the main frame of the apparatus, which carries the transportation means, is disposed stationarily and the offset printing arrangement is adjustable relative to the main frame or the transportation means carried thereby. Such a configuration makes it easily possible to establish a surface or a plane of the transportation means, as a reference surface. If the holding means for the articles to be printed upon are all of the same design configuration and are carried by the transportation means, the underneath boundary surface of each article, with which the article rests on the support surface of the respective holding means, is accurately determined in regard to its position in respect of height so that the position of the surface to be printed upon can be accurately ascertained in a simple fashion by way of the sensor device and the ascertained value corresponds to the thickness of the respective individual article.

It will be appreciated that the position of the transfer surface relative to the surface to be printed upon, when transferring the print image, is crucial in terms of the quality of the print image, also applies in regard to transfer of the print image from the plate cylinder on to the respective portion of printing blanket on the printing cylinder. For that reason the invention provides the possibility of also moving the plate cylinder or cylinders, in each operation of transferring a print image from a plate cylinder on to the respective portion of printing blanket, into a position which is the optimum position for the transfer operation, relative to the transfer surface of the portion of printing blanket, which surface is the receiving surface in this case, that is to say, in the transfer from the plate cylinder to the portion of printing blanket. That involves a relatively small increase in expenditure as the position of the transfer surface of the at least one portion of printing blanket is in any case detected by the above-mentioned sensing device and stored. The only additional measure required would be the association with each plate cylinder of an adjusting or control motor which adjusts the position of the plate cylinder in dependence on the radial position of the transfer surface of the respective portion of printing blanket. In this case also it will normally suffice to register a mean value for the radial position of the transfer surface over the configuration thereof in the peripheral direction of the printing cylinder. If appropriate however it would also be possible for the position of the plate cylinder to be adapted depending on the configuration of the transfer surface during transfer of the print image from the plate cylinder on to the respective portion of printing blanket.

Further objects, features and advantages of the present invention will be apparent from the following description of a preferred embodiment.

BRIEF DESCRIPTION OF THE DRAWINGS

FIG. 3 is a side view of the apparatus in the direction indicated by the arrow III in FIG. 2.

DESCRIPTION OF THE PREFERRED EMBODIMENT

Figure 1:
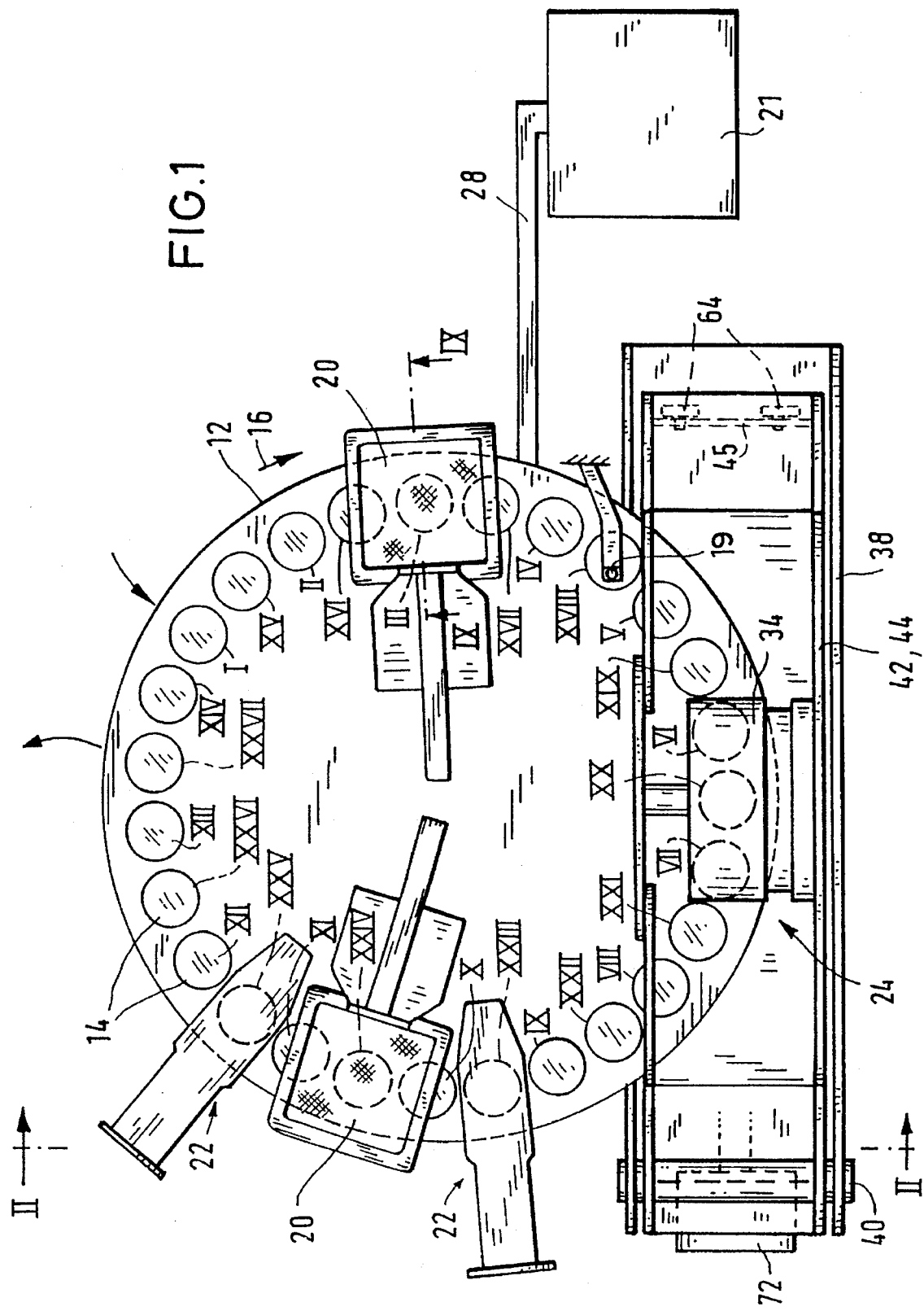
FIG. 1 is a plan view of the basic structure of an apparatus for printing on flat individual articles, involving the use of an offset printing process.

Referring firstly to FIGS. 1, 2, 3 and 5, an apparatus for printing on generally flat individual articles comprises a bask or main frame generally indicated at 10, which carries a round table 12 which is rotatable with a stepwise motion about a substantially vertical axis and serves to hold and transport the individual articles to be printed upon, which are indicated at 15. The transportation table 12 is provided for that purpose with an odd number of holders 14 each having a respective support surface 27, wherein the holders are arranged in their entirety coaxially with respect to the drive shaft 11 of the table 12, adjacent the periphery of the latter. Consequently the individual articles to be printed upon are transported along a circular transportation path in the direction indicated by the arrow 16 from a receiving station I to a removal station XXVII. In each transportation step, the table 12 is advanced with an arcuate movement by a distance corresponding to two holders 14 and each holder 14 with the article 15 carried thereby, in moving between the receiving station I and the removal station XXVII, covers a distance which corresponds to almost two revolutions of the table 12. The articles 15 to be printed upon are fitted into the holders 14 by suitable devices which are associated with the table 12 and which are not directly related to the present invention so that there is no need for them to be described in further detail herein. The operation of introducing the articles 15 into the holders 14 is normally effected using a pivotal arm of which one end is designed in a suitable fashion and is connected to a reduced-pressure source. That end of the pivotal arm is caused to bear against the article which is normally the upper article in a supply stack of articles, whereupon the article is removed from the stack and fitted into the respective holder 14 disposed in the receiving station I. The above-described procedure takes place in the reverse sequence in the removal station XXVII which is disposed upstream of the receiving station in the direction of rotation 16. A pivotal arm of corresponding configuration is caused to bear against the respective printed article disposed in the removal station XXVII so that in the subsequent movement of the arm that article is removed from the holder 14 and fed to an intermediate holding arrangement which is disposed outside the table 12 and in which the individual articles that have been printed upon are usually stacked before the stack is carried away for further use, after attaining a given height. Both the pivotal arms and also the intermediate holding arrangements associated with the receiving and removal stations respectively are of any appropriate known design configuration and are therefore not described in further detail here.

In the receiving station I the individual article to be printed upon is centered after it has been introduced in the above-described manner into the respective holding means 14 disposed in that receiving station, for example by a centering pin being passed through the central opening in a CD. When the article is in the centered position in that way, it is held in the centered position by a reduced pressure until, after all treatment operations have been carried out thereon, it passes into the removal station XXVII in which it is removed from the respective holder by the removal arrangement.

From the receiving station I, after having been centered, the individual article passes in the next transportation stepping motion into a station II in which it is identified in order to ensure that for example in the case of a CD the piece of musk recorded thereon is in conformity with the print image to be applied. The devices used for that purpose are of any suitable known kind and are not separately illustrated in the drawing.

With the next transportation stepping motion, the individual article is moved from the identification station II into a first printing station III which has a screen printing mechanism 20. Here a basic application of ink is applied for example in the form of a background or overall covering using a conventional screen printing procedure to the surface 25 of the article 15, which is to be printed upon. In a subsequent treatment step which will be described hereinafter a print image will then be applied to the basic application of ink using an offset printing procedure. The individual article which is printed upon by means of a screen printing procedure in station III then passes through six transportation steps, without undergoing any further treatment. In the seventh transportation step in which the article moves from station IX into station X the article passes through a first drying station XXIII in which the ink which has been previously applied in the screen printing station III is dried, normally by means of an UV-radiating device 22. After passing through the drying station XXIII the individual article is transported from the station X in the following eight transportation stepping movements of the table 12 into a measuring station XVIII with which there is associated a sensor device 19 for ascertaining the position of the surface 25 which is to be printed upon, of the individual article, that is to say the level at which that surface 25 is disposed. In other words, with the individual article in a defined position in the respective holder 14 in the station XVIII, the thickness of the individual article which can suffer from fluctuations due to the manner of manufacture thereof is ascertained. The sensor device 19 is provided with a sensor or feeler member 23 which is brought into contact with the surface 25 to be printed upon of the article 15 (see FIG. 3). It is however also possible to use a contact-less proximity sensor. The output of the sensor device 19, which corresponds to the position of the surface 25 to be printed upon, is passed by way of a line system 28 to a computing arrangement 21 and firstly stored therein in order then to be used to adjust the offset printing arrangement in a manner to be described hereinafter.

In the event of the absence of an individual article in one of the holders 14, that is also detected by the sensor device 19 in the station XVIII. The output of the sensor device 19, corresponding to the absence of an article in the holder 14, is passed to and stored in the computing arrangement 21, instead of the output which normally corresponds to the position of the surface 25 of the article 15, which is to be printed upon.

From the measuring station XVIII the individual article 15 passes after two further transportation stepping motions of the table 12 into a second printing station XX which is also provided with an offset printing arrangement 24. In that station, a print image is applied by means of an offset printing process to the ink layer previously applied in the first printing station III. After the offset printing operation the article passes after three further transportation stepping movements into the drying station XXIII in which the ink previously applied by means of the offset printing procedure is dried by the UV-radiating device 22, until the next transportation stepping movement is performed.

With the next transportation stepping movement the article passes into a third printing station XXIV which is also provided with a screen printing mechanism 20. Here a protective layer which for example comprises transparent lacquer is applied by a screen printing process to the print image previously applied by means of offset printing. Thereafter, with the following transportation stepping movement, the article passes into a second drying station XXV in which the protective layer applied in the station XXIV is dried for example by means of UV-radiating devices 22. After two further stepping movements the article is in the removal station XXVII in which it is removed from the apparatus in the manner already described above.

The two screen printing mechanisms 20 in the printing stations III and XIVXXIV respectively and the two drying arrangements in the two drying stations XXIII and XXV may be provided with the usual items of equipment and apparatuses which are known to the man skilled in the art and therefore do not need to be described in greater detail herein.

The offset printing arrangement which is arranged above the table 12, like the screen printing mechanisms 20, has a generally continually rotating printing or blanket cylinder 34 with which there is associated a number of inking mechanisms and plate cylinders 36, said number corresponding to the number of inks or colors to be used. The embodiment illustrated in the drawing involves the use of four-color printing so that accordingly there are four plate cylinders 36 which each transfer a respective partial print image on to the printing cylinder 34, where those partial print images go together to form an overall print image. The overall print image is transferred from the printing cylinder 34 on to the individual article. Those relationships in terms of printing technology and the basic structure of an offset printing mechanism and in particular also the structure of the inking mechanisms associated with the individual plate cylinders are generally known and therefore do not need to be described in greater detail herein.

The offset printing arrangement 24, that is to say the offset printing mechanism in its entirety with inking mechanisms and plate cylinders, is mounted adjustably in order if necessary to be able to adapt the printing cylinder 34 to the level of the respective surface 25 to be printed upon.

Figure 2:
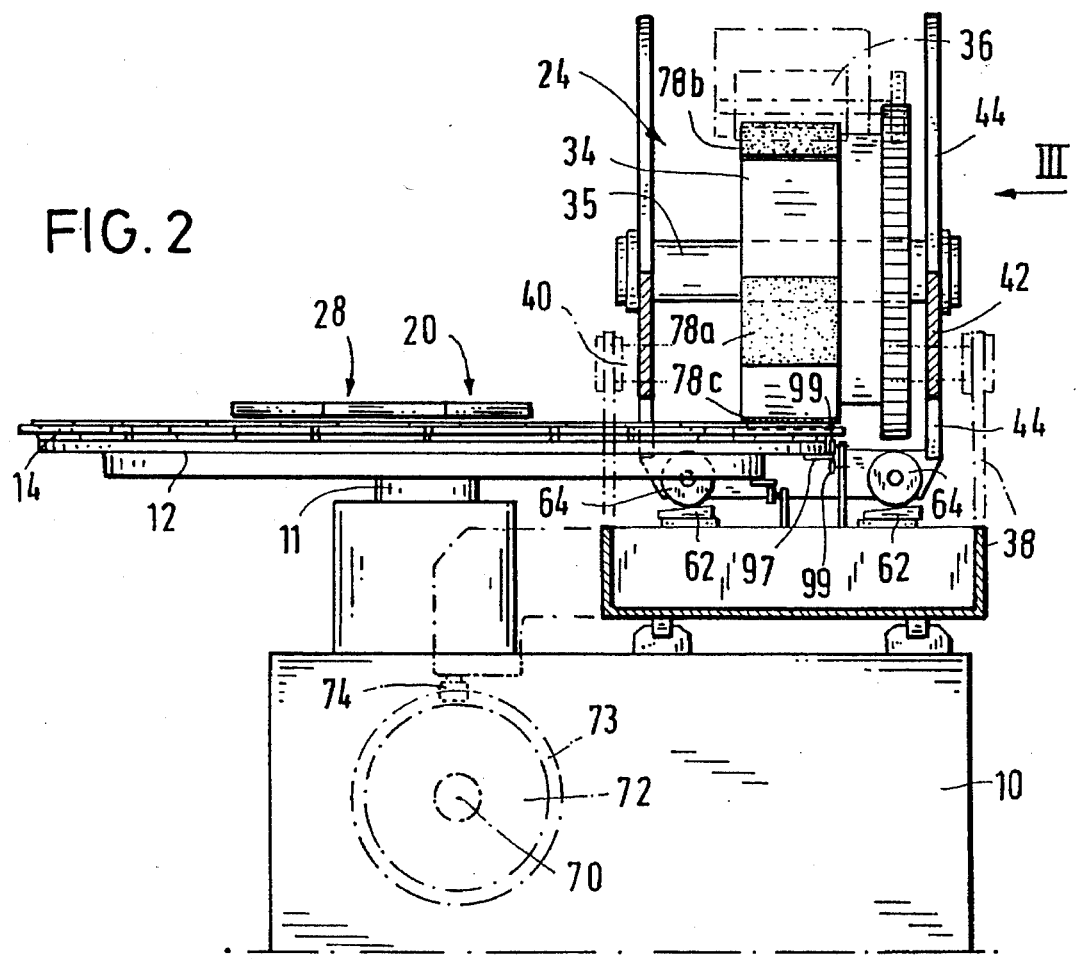
FIG. 2 is a front view of such an apparatus approximately in the direction indicated by the arrows II—II in FIG. 1.
Figure 4:
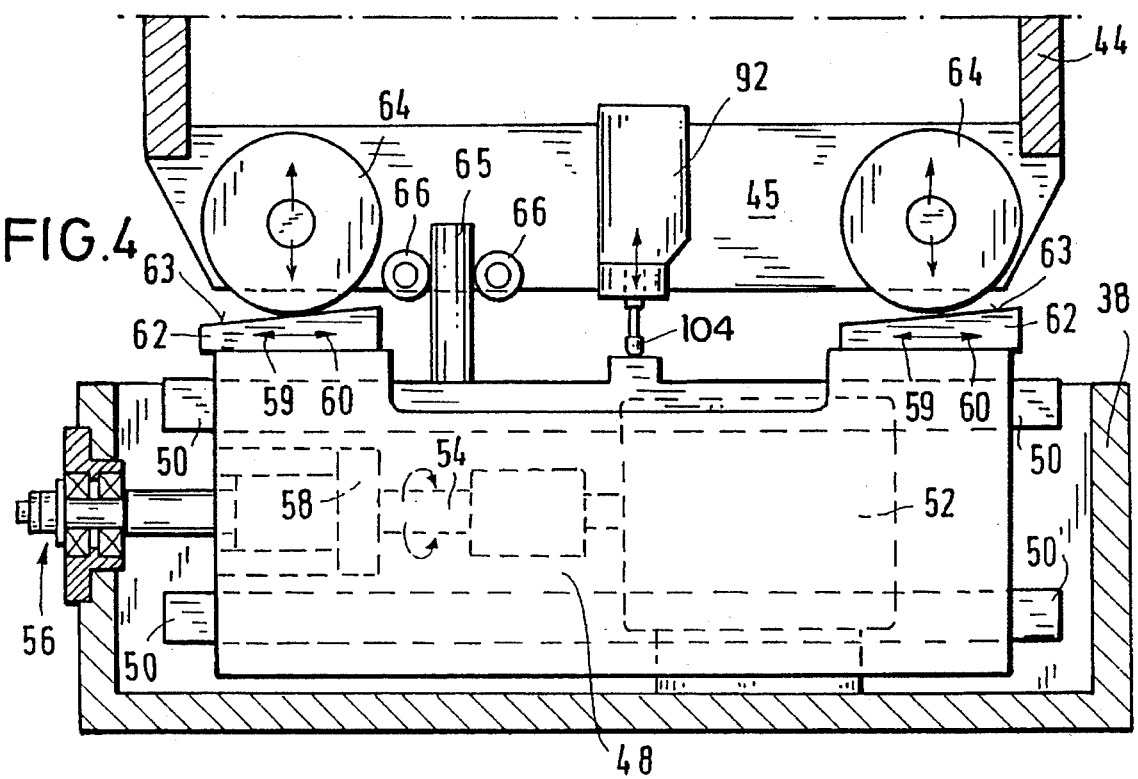
FIG. 4 is a view in the direction indicated by the arrows IV—IV in FIG. 3, essentially showing a part of FIG. 2 on a larger scale.

Continuing with FIGS. 1 and 2 but referring also to FIGS. 3 and 4, for that purpose the printing arrangement 24 is mounted on a first slide or carriage 38 pivotably about an axis or spindle 40 carried by the carriage 38. The spindle 40 extends parallel to a drive shaft 35 of the printing cylinder 34. It is mounted adjacent one end of the first carriage 38. Side portions 42 of a frame 44 carrying the offset printing arrangement 24 are provided adjacent one end of the frame 44 but at any event at a substantial distance from the printing cylinder 34 with through openings and rolling bearing assemblies 46 for carrying the spindle 40 so that pivotal movement of the printing arrangement 24 about the axis of the spindle 40 results in a corresponding change in the position in respect of height of the printing cylinder 34. The lateral displacement of the printing cylinder, which simultaneously takes place in that pivotal movement, is so slight that it does not need to be taken into account.

Provided in the region of the first carriage 38, that is remote from the spindle 40, is a second slider or carriage 48 which is mounted in the first carriage 38, as shown in FIG. 4. For that purpose the first carriage 38 is provided with guide bars 50 which extend parallel to the pivot spindle 40 and on which the second carriage 48 is longitudinally slidably mounted, with the interposition of sliding bearings. Displacement of the second carriage 48 is produced by a control or adjusting motor 52 driving a spindle 54 which extends parallel to the guide bars 50 and which is mounted at 56 in the first carriage 38 and which co-operates with a spindle nut 58 fixed to the second carriage 48. Actuation of the motor 52 therefore results in displacement of the second carriage 48 in the direction indicated by one of the arrows 59 and 60 respectively, by way of the spindle 54 and the spindle nut 58.

At the top the second carriage 48 is provided with two wedge-shaped extension portions 62 which are each defined at their top side by a respective inclined adjusting surface 63. The two surfaces 63 are inclined in the same direction and are identical to each other in regard to their position in respect of height and the angle of inclination thereof.

At its end remote from the spindle 40, the frame 44 for the offset printing arrangement 24 carries two adjusting rollers 64 on a holder 45, which are rotatable about axes extending perpendicularly to the guide bars 50 and perpendicularly to the spindle 40. The region that is remote from the spindle 40 of the frame 44 carrying the offset printing arrangement 24 is supported by way of the two adjusting rollers 64 on the surfaces 63 of the wedge-shaped extension portions 62 of the second frame 48. FIG. 4 of the drawing shows that the relative position of the two wedge-shaped extension portions 62 with respect to the respectively associated adjusting rollers 64 determines the position in respect of height of the rollers 64 and therewith also the position in respect of height of the frame 44 which carries the offset printing arrangement 24. Accordingly displacement of the second carriage 48 which bears the wedge-shaped extension portions 62, such displacement being produced by the motor 52, causes a corresponding variation in the position in respect of height of the frame 44 carrying the offset printing arrangement. In that way the position in respect of height of the printing cylinder 34 can be accurately adapted to the position in respect of height of the surface 25, that is to be printed upon, of the respective article 15 disposed in the printing station XX, after the position of the surface 25 to be printed upon had been previously ascertained by the sensor device 19 in the measuring station XVIII.

The first carriage 38 is provided with an upwardly projecting guide rail or bar 65 against which bear two guide rollers 66 which are carried by the frame 44 of the offset printing arrangement 24. The co-operation of the two rotatably mounted rollers 66 with the guide rail or bar 65 is intended to provide for additional stabilization of the position of the frame 44 and therewith the offset printing arrangement carried thereby, as the frame 44 is held essentially only by the pivot spindle 40 and, by way of the two adjusting rollers 64, by the extension portions 62 of the second carriage 48.

The operation of printing on the respective individual article 15 held by the holder 14 disposed in the offset printing station XX is effected in the course of a lateral displacement of the offset printing arrangement 24 and therewith the shaft 35 and the printing cylinder 34 which is carried thereby and which in that operation is rolled against the individual article. For that purpose, the first carriage 38 is arranged to be horizontally reciprocatable in directions 68 and 69 which are perpendicular to the axis of rotation constituted by the spindle 35 of the printing cylinder 34. A motor (not shown) which is disposed in the machine frame 10 drives by way of a shaft 70 a cam drum 72 having a cam 73 with which two cam follower rollers 74 are in engagement. The two cam follower rollers 74 are mounted rotatably on the first carriage 38 in such a way that rotation of the can drum 72, by virtue of the configuration of the cam 73, produces a reciprocating movement of the first carriage 38 which carries the offset printing arrangement 24, in the directions of the arrows 68 and 69 respectively. During the movement in the direction of the arrow 69 the print image is transferred from the printing cylinder 34 on to the respective article disposed in the printing station XX. After the printing cylinder 34 reaches the limit position in the course of that printing operation, the first carriage 38 with the printing arrangement 24 carried thereby is moved back again in the direction indicated by the arrow 68 into the starting position for the next printing operation.

The periphery of the printing cylinder of an offset printing arrangement is provided with a transfer means which is generally in the form of a printing blanket which comprises rubber material and to whose external surface the individual print images are successively applied by the plate cylinders in the course of the rotary movement of the printing cylinder, so that after passing the last plate cylinder the printing blanket on the printing cylinder carries the complete print image which, in a following printing operation, is then transferred on to the article to be printed upon, from the external surface of the transfer means, that external surface being referred to hereinafter as the transfer surface. FIG. 3 in particular shows that, in the embodiment illustrated in the drawings, the transfer means and therewith also the transfer surface are subdivided into four parts 78a, b, c, d and 95a, b, c and d respectively, which are each arranged in a uniformly distributed array over the periphery of the printing cylinder 34, with spacings 79 being maintained therebetween. As the printing blanket parts 78a–d of the transfer means are of a certain thickness, the result of this arrangement is that the outside diameter of the printing cylinder 34 in the region of those parts 78a–d is larger than in the portions which occur between those parts and which constitute the spacings 79.

Figure 8:
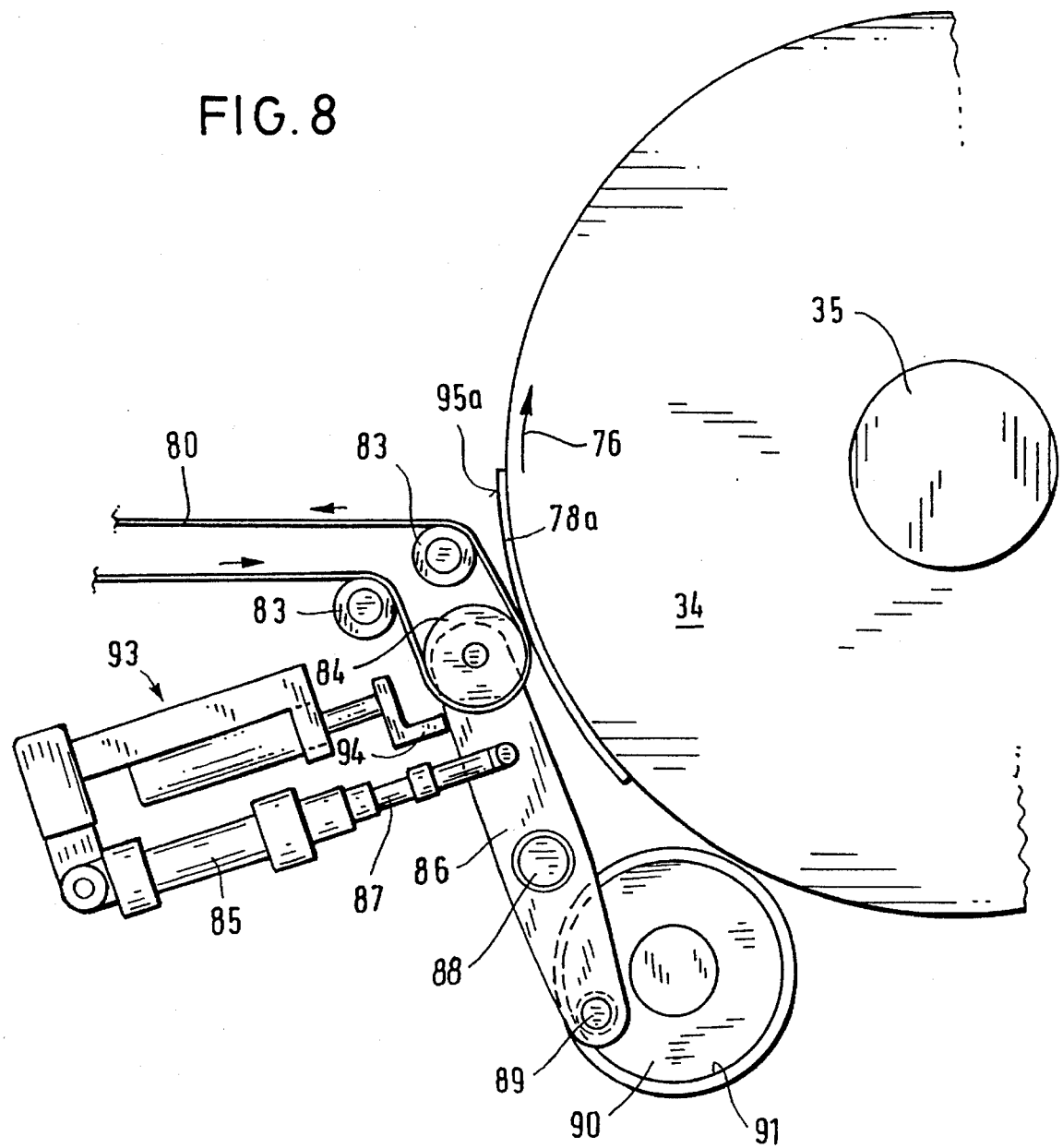
FIG. 8 shows a part of FIG. 3 on a substantially larger scale.

Referring to FIGS. 3 and 8, it will be seen therefrom that associated with the offset printing arrangement 24 is a web of material 80 which is drawn from a supply reel 81 in the usual way and which is wound on to a second reel 82 again after it has been used or treated. Near the printing cylinder 34 the web of material 80 is guided by way of direction-changing rollers 83 and an impression cylinder 84 which is mounted rotatably adjacent an end of a double-arm lever 86. The lever 86 is mounted pivotably on a pin 88 carried on the frame 44, in such a way that, depending on the position assumed by the double-armed lever 86, the impression cylinder 84 and possibly the portion of the web of material 80 which is guided around the impression cylinder 84 either comes into contact with the transfer surface 95a–d of one of the parts 78a–d of the transfer means, or is disposed at a spacing from same. When the lever 86 assumes a position in which the impression cylinder 84 or the portion of the web 80 carried thereby is in contact with a part 78a–d on the printing cylinder 34, a print image which is disposed on that part is transferred on to the web of material 80.

Actuation of the double-armed lever 86 is effected on the one hand by an elastic means, such as pneumatic cylinder unit 85 which is mounted to the frame 44. The piston rod 87 of the piston which is guided in the cylinder 85 is pivotally connected to the double-armed lever 86 between the mounting pin 88 thereof and the impression cylinder 84. At the end of the double-armed lever 86, which is remote from the impression cylinder 84, the lever 86 carries a cam follower roller 89 cooperating with a cam 91 of a cam disk 90. The cam 91 now acts in a direction such that it restricts the approach movement of the impression cylinder 84 towards the printing cylinder 34. In that respect the configuration of the cam 91 is so selected that, starting from the position of the co-operating members shown in FIG. 8, after the part 78a of the transfer means has passed the impression cylinder 84 in the course of the rotary movement of the printing cylinder 34 in the direction indicated by the arrow 76, the cam 91 prevents the impression cylinder 84 with the portion of the web 80 that is possibly associated therewith from coming into contact under the effect of the piston movable in the cylinder unit 85, with the peripheral surface of the printing cylinder 34 in the regions 79 between the parts 78a–d. The configuration of the cam 91 is thus matched to the length of the parts 78a–d and the length of the regions 79 therebetween. There is therefore no need for the position of the impression cylinder 84 to be accurately controlled in that respect by the piston which is guided in the pneumatic cylinder unit 85.

A sensor device 93 is further associated with the double-armed lever 86 and thus with the impression cylinder 84. The sensor device 93 has a sensor or feeler member 94 which is connected to the double-armed lever 86 and which thus if necessary can ascertain the respective position thereof and therewith also the position of the impression cylinder 84. That makes it possible for the impression cylinder 84 with the sensor device 93 associated therewith to be used for determining the position and/or the configuration of the individual external surfaces of the parts 78a–d, said surfaces serving as transfer surfaces 95a–d, in the peripheral direction of the printing cylinder 34, so that the sensor device can output outputs which correspond to the position or the configuration respectively of the individual transfer surfaces 95a–d and which can be stored in the computing arrangement 21. It has already been mentioned that the individual printing blanket parts 78a–d may be of different thicknesses, with the result that the transfer surfaces of the individual parts of the printing blanket assume different radial positions. There is also the possibility that the transfer surfaces 95a–d do not in any way always extend precisely coaxially with respect to the theoretical axis of rotation of the printing cylinder 34 although the variations are admittedly slight. However, they may be sufficient to influence the relative positions of the surface 25 to be printed upon and the transfer surface 95a–d, in such a way that the optimum pressure between the surface 25 and the respective transfer surface 95a–d no longer occurs and thus the quality of the print image produced is adversely affected. That is avoided if for example before the commencement of a print run, the position and/or the configuration of the transfer surfaces 95a–d is or are detected by the sensor device 93 and stored in the computing arrangement 21 and the position or configuration of the respective transfer surfaces 95a–d is called up for each printing operation in dependence on the rotary movement of the printing cylinder 34 and additionally taken into consideration in terms of the positioning of the offset printing arrangement 24 for the respective printing operation. Checking of the position and/or the configuration of the transfer surfaces can be repeated at intervals of time or for a specific reason, for example after replacement of one or more of the parts 78a–d. In general it will be sufficient to determine a mean value in respect of the position and the configuration of each transfer surface, so that there is no need to take special account of changes in the radial position over the configuration of the individual transfer surfaces as considered in the peripheral direction of the printing cylinder. Although the web of paper 80 is not necessarily required for ascertaining the position and/or configuration of the transfer surfaces 95a–d, it may be passed over the impression cylinder 84 in this checking operation if that does not give rise to any additional inaccuracies.

Figure 5:
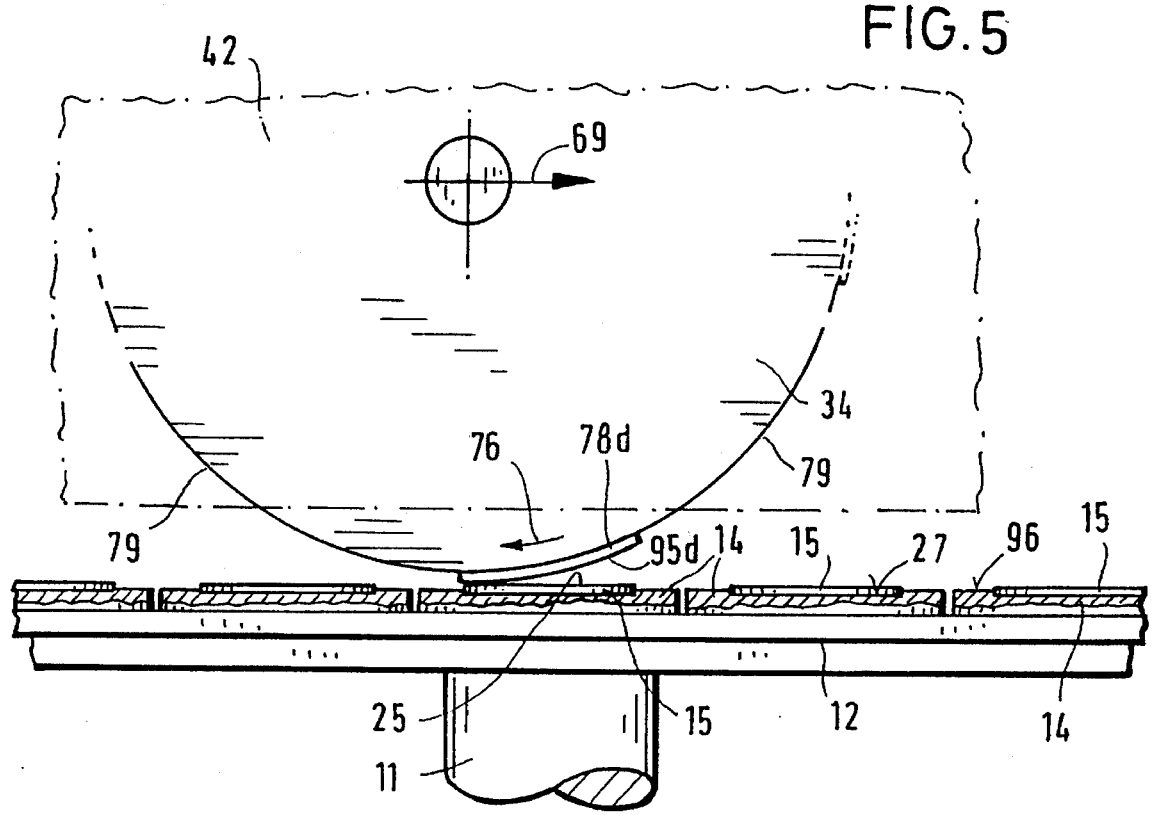
FIGS. 5 through 7 show the procedure involved in printing on an individual article by means of the offset printing process in three successive phases in the printing operation.
Figure 6:
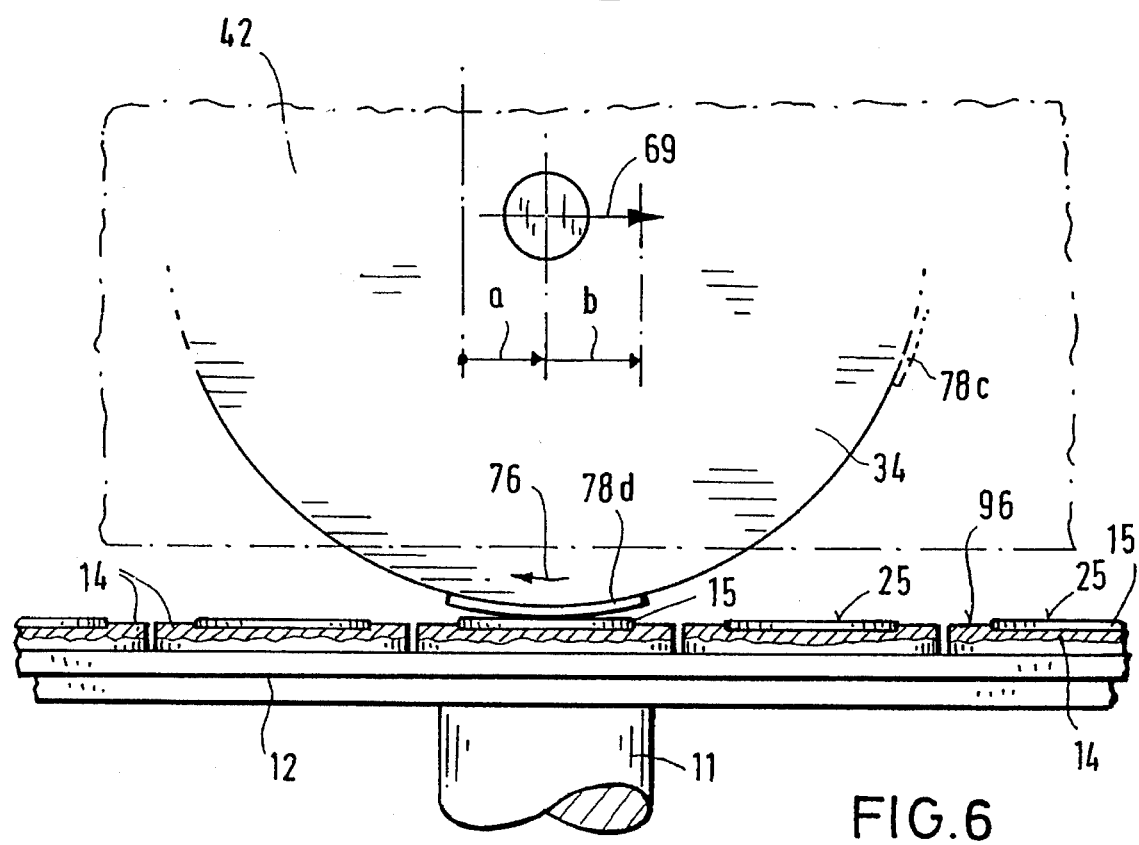
Figure 7:
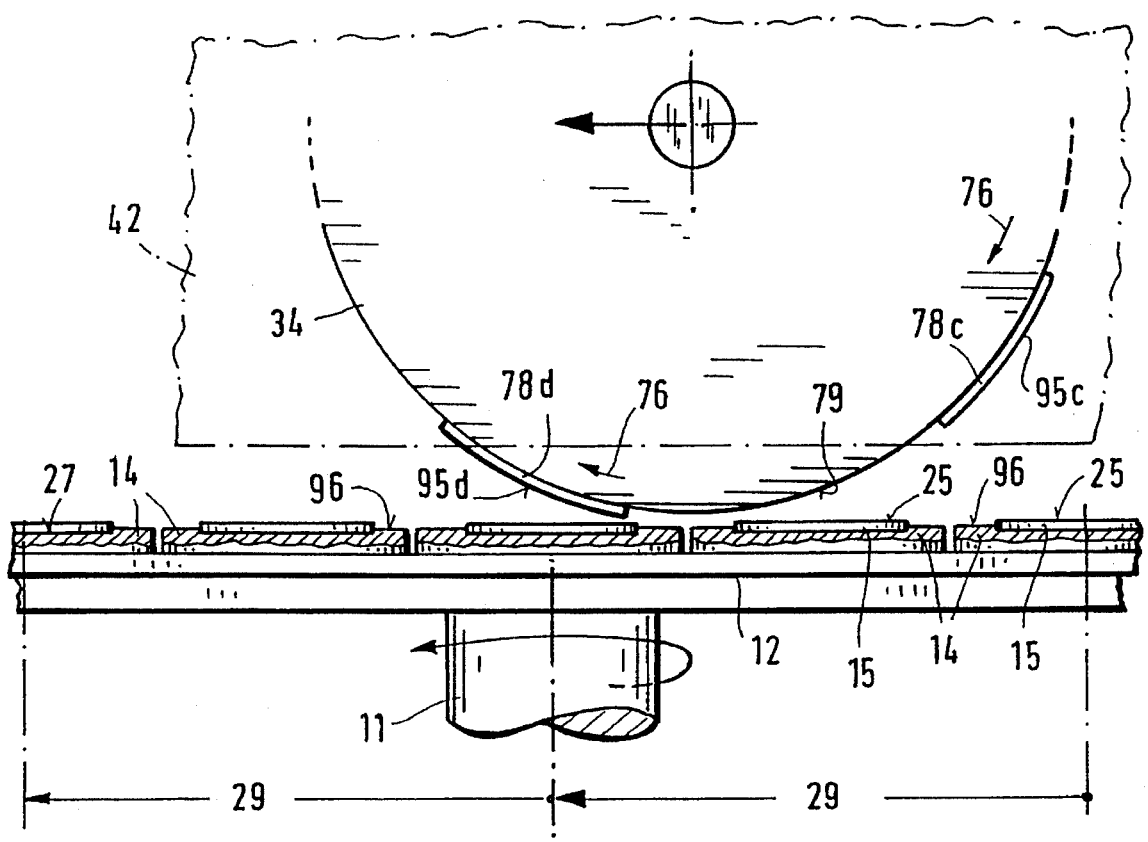

Reference is now made to FIGS. 5 through 7 showing the procedure involved in a printing operation in the offset printing station XX. The printing operation begins after the termination of the transportation stepping motion (indicated by arrow 29) by which the article 15 has been transported from the station XIX into the printing station XX. During the transportation stepping motion the printing arrangement 24 had been moved back into the left-hand starting position and had been put into the correct position in respect of height relative to the surface 25 of the article now disposed in the printing station XX. For execution of the printing operation, the printing cylinder 34 is displaced laterally from a left-hand limit position in the direction indicated by the arrow 69, the speed of that lateral displacement corresponding to the peripheral speed at which the printing cylinder 34 rotates in the direction indicated by the arrow 76, in such a way that no noticeable slippage occurs while the transfer surface 95d of the part 78d and the surface 25 to be printed upon of the article 15 roll against each other. FIG. 5 shows the position of the cooperating components in the initial phase of the printing operation. The transfer surface 95d of the part 78d of the transfer means is already in contact with the surface 25 to be printed upon. In the course of the further movement the part 78d rolls against the surface 25 to be printed upon. FIG. 6 shows the position of the cooperating components approximately in the middle of the printing operation. By the time the position shown in Finite 6 has been reached, the printing cylinder 34 has been displaced from its left-hand limit position in the direction indicated by the arrow 69, approximately by the distance a. The distance b is the distance that still has to be covered before the end of the printing operation, that is to say in order for the printing cylinder 34 to move into the right-hand limit position.

FIGS. 5 through 7 also show in particular that the surface 25 of the article 15 that is to be printed upon is arranged higher than the upper boundary surface 96 of the respective holder 14. That is generally necessary having regard to the particular characteristics of offset printing.

The result of the transfer means being subdivided into four parts 78a–d with respectively interposed portions 79 involving the smaller diameter of the printing cylinder 34 is that, after termination of the printing operation, in the course of the rotary movement of the printing cylinder 34 in the direction indicated by the arrow 76, contact between the printing cylinder 34 and the article to which printing has now been applied is terminated at the moment at which, in the course of that rotary movement, the respective printing blanket part, namely the part 78d in the case of FIGS. 5 through 7, comes out of contact with the individual article which hitherto was held in a stationary position in the printing station X. In the course of the further rotary movement, the portion 79 of the periphery of the printing cylinder 34, being the portion 79 adajoining the part 78d of the printing blanket, passes into the region of that article and thus into the region of the transportation path along which the articles are transported by the table 12. By virtue of the above-mentioned fact that the outside diameter of the printing cylinder 34 is smaller in the portions 79, that means that the printing cylinder 34, in the course of its rotary movement, comes out of engagement at its periphery with the previously printed article automatically, that is to say without the printing cylinder 34 having to be lifted, so that the article with the printing thereon can be moved along the path of transportation movement although the printing cylinder 34 remains opposite the transportation path above seine. It is therefore important for the stepwise transportation movements of the articles, which are produced by the table 12, to be matched to the rotary movement of the printing cylinder 34 and possibly also the return movement of the printing arrangement in the direction indicated by the arrow 68 into its initial position, in order to be able to perform the necessary transportation movements, that is to say in particular transporting the printed article out of the printing station and transporting the following article to be printed upon, into the printing station, without requiring particular measures, for example lifting the printing cylinder 34 or lowering the holder 14. It will be appreciated that there is alternatively also the possibility of lifting the printing cylinder 34, if necessary together with the entire printing arrangement 24, after the termination of each printing operation, in order in that way to move the periphery of the printing cylinder 34 out of the region of the movement of the articles along the transportation path. That however would require additional time and also additional shift procedures which could reduce the level of productivity of the apparatus.

If it is detected by the sensor device 19 in the station XVIII that there is no article in the respective holder 14 disposed in that station, then after two transportation stepping motions after which the empty holder is disposed in the offset printing station XX, the impression cylinder 84, under the control of suitable signals from the computing arrangement 21, is moved by actuation of the cylinder unit 85 into a position in which, in the manner shown in Finite 8, it brings the portion of the web of material 80 associated therewith into contact with that part 78a–d of the transfer means which, because of the absence of an article in the printing station XX, still bears the print image applied thereto. That print image is now transferred on to the web of material 80 which in this operation is moved approximately synchronously with the peripheral speed of the transfer surface 95a, so that the print image is taken from the respective part 78a of the transfer means and the latter is provided with a fresh print image again when it subsequently passes the plate cylinders. This procedure ensures that, in the absence of an article in the holder 14 disposed in the offset printing station XX, the part 78a of the transfer means does not receive a second print image on a print image which is still present thereon, when that part 78a subsequently passes the plate cylinders. After the part 78a has passed, the impression cylinder 84 can be pivoted back into the inoperative position by the piston which is movable in the cylinder unit 85, by virtue of suitable actuation of the latter.

The drive for the web of material 80 can be produced in that situation in a suitable fashion by the computing arrangement 21 which for example controls the reels 81 and 82. As shown in FIG. 3 the latter are disposed in a stationary frame 98 which also has the necessary devices for compensating for the variations in the spacings between the impression cylinder 84 and the web of material 80 in the region of the stationary frame, such variations being caused by the reciprocating movement of the impression cylinder 84 with the frame 44 carrying seine of the offset printing arrangement 24. A drying device 107, for example an UV-radiating device 99, is associated with the portion 77 of the web of material 80, which bears a print image thereon and which is returning from the impression cylinder 84, in order to dry the print images which have ken produced on the web portion 77 which thus operates as a replacement or substitute article.

Figure 11:
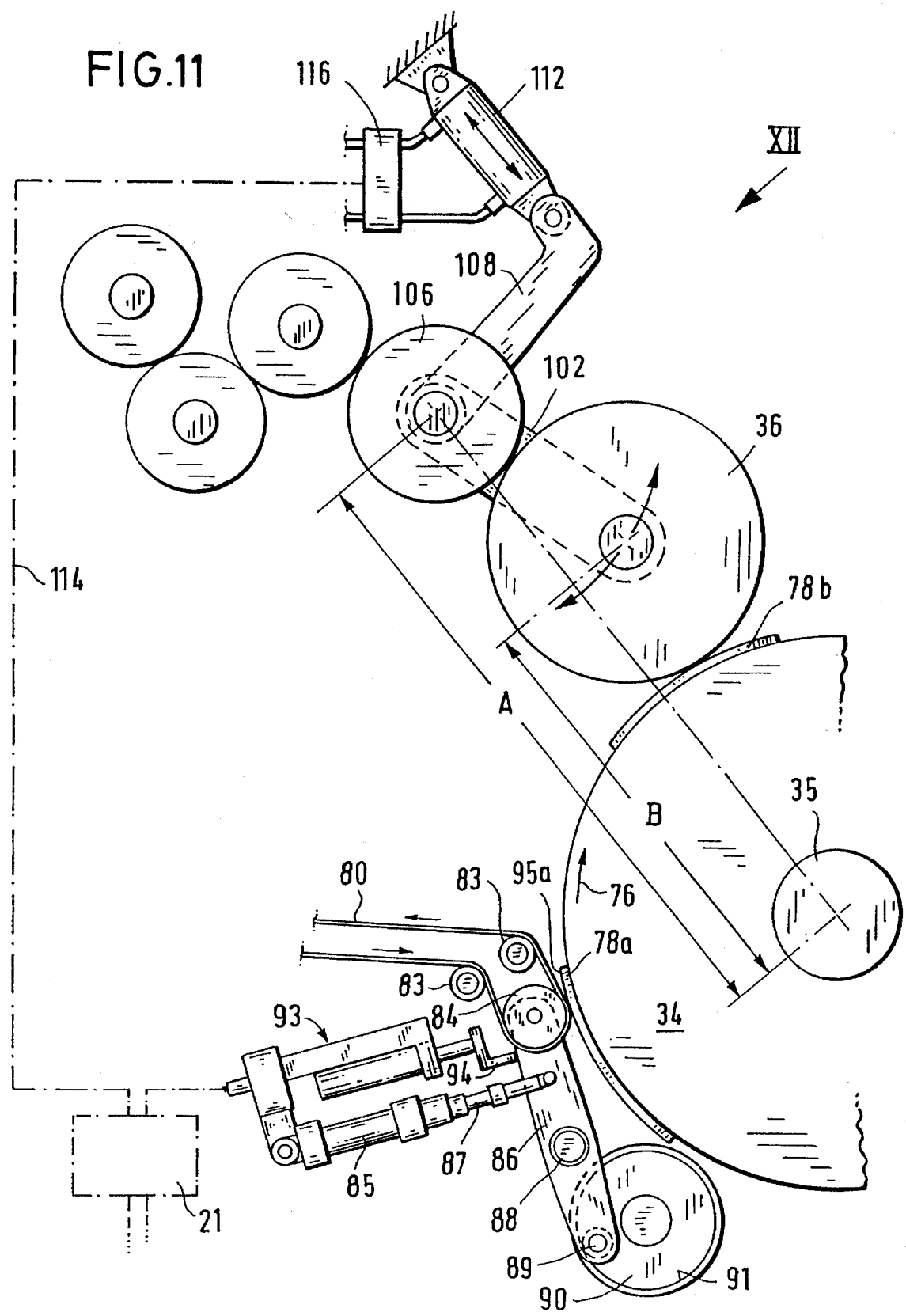
FIG. 11 shows a side view of a part of the printing mechanism on an enlarged scale.
Figure 12:
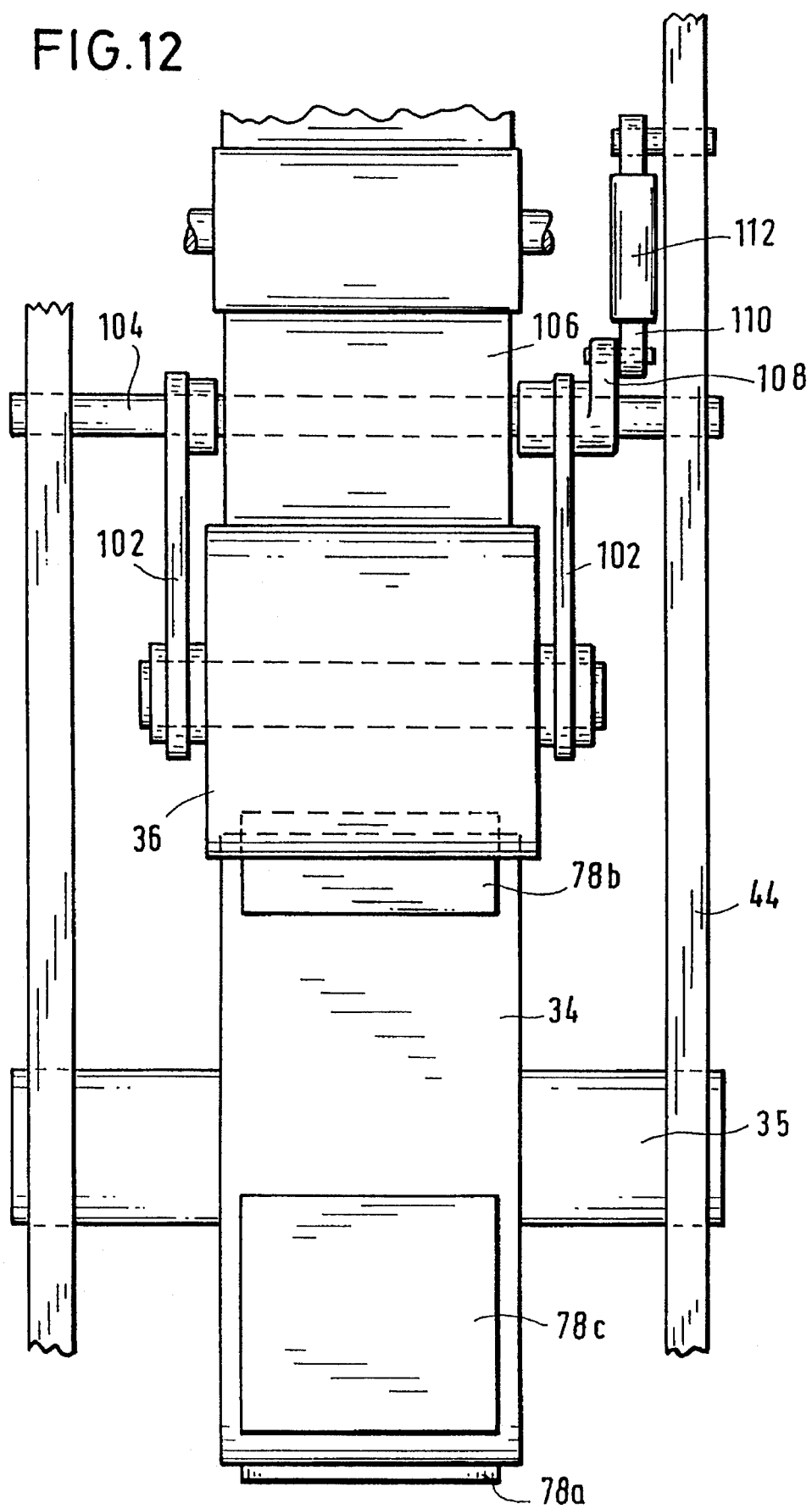
FIG. 12 is a view approximately in the direction indicated by the arrow XII in FIG. 11.

The quality of the print images which are to be applied to the articles 15 can be further improved if the plate cylinders 36 of the printing mechanism are also arranged adjustably in such a way that they can be moved into the optimum position relative to the radial position of the respectively associated transfer surface 95a–d, in the operation of transferring the individual print image on the peripheral surface of the respective plate cylinder 36, on to one of the printing blanket parts 78a–d. Referring therefore to FIGS. 11 and 12, for that purpose, the plate cylinders 36 are arranged adjustably in such a fashion that they are each mounted rotatably in two arms 102 which in turn are carried pivotably by the shaft 104 of the inking cylinder 106 associated with the respective plate cylinder 36. In that arrangement at least one of the two arms 102 is fixedly connected to one end of a pivotal arm 108, the other end of which is pivotally connected to the piston rod 110 of a hydraulic cylinder unit 112 which in turn is mounted pivotably on the machine frame structure 44. When the position or configuration of each of the transfer surfaces 95a–d is stored in the computing arrangement 21 in the manner described hereinbefore, it is possible depending on the rotary movement in the direction indicated by the arrow 76 of the printing cylinder 34 for each of the plate cylinders 36 to be moved into the position which is the optimum position in each case relative to the printing blanket part 78a–d or the transfer surface 96a–d thereof, for transfer of the individual print image on the periphery of the plate cylinder, on to the respective transfer surface 95a–d, so that that transfer operation enjoys advantageous conditions in terms of affording good quality of the print image produced. The appropriate data are passed by way of a line 114 from the computing arrangement 21 to a control device 116 which provides for suitable actuation of the cylinder 112 and the piston guided therein. Control devices of that kind are generally known so that there is no need for detailed representation thereof in the drawing.

Because the respective plate cylinder 36 is pivoted about the axis of the respectively associated inking cylinder 106 for the purposes of adjustment relative to the respective printing blanket part 78a–d, that ensures that the plate cylinder 36 always remains in the correct relative position with respect to its inking cylinder 106. The spacing A between the inking cylinder 106 and the printing cylinder 34 remains constant while the spacing B between the plate cylinder 36 and the printing cylinder 34 is determined by the respective position of the plate cylinder 36. Instead of the piston-cylinder unit 112 it is also possible to use another actuating means, for example a control motor. In other words, the printing mechanism illustrated in the drawing would then be provided with four control motors for the four plate cylinders 36.

Figure 9:
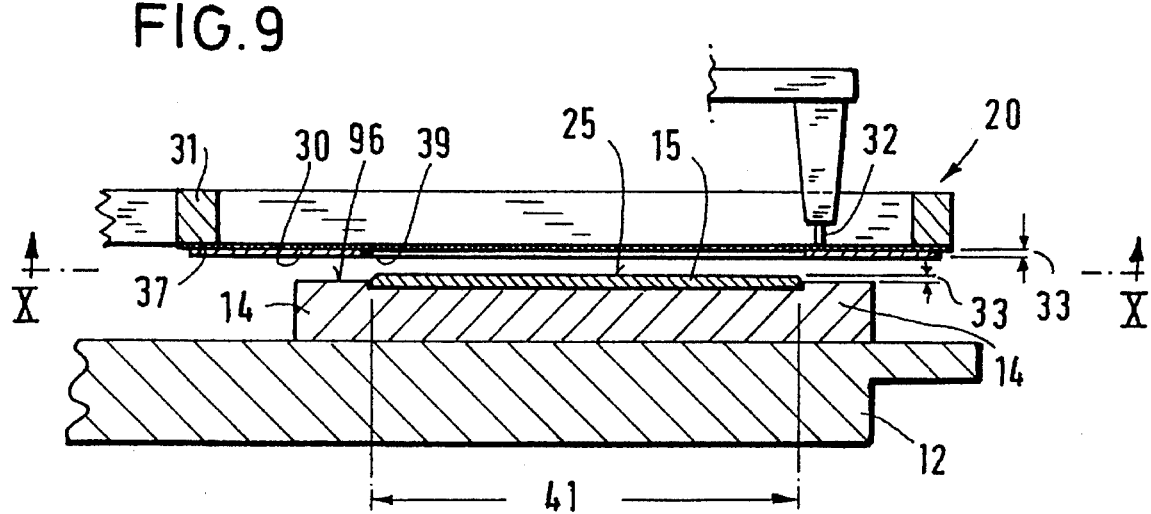
FIG. 9 is a view in section through one of two screen printing mechanisms in FIG. 1 taken along line IX—IX in FIG. 1.
Figure 10:
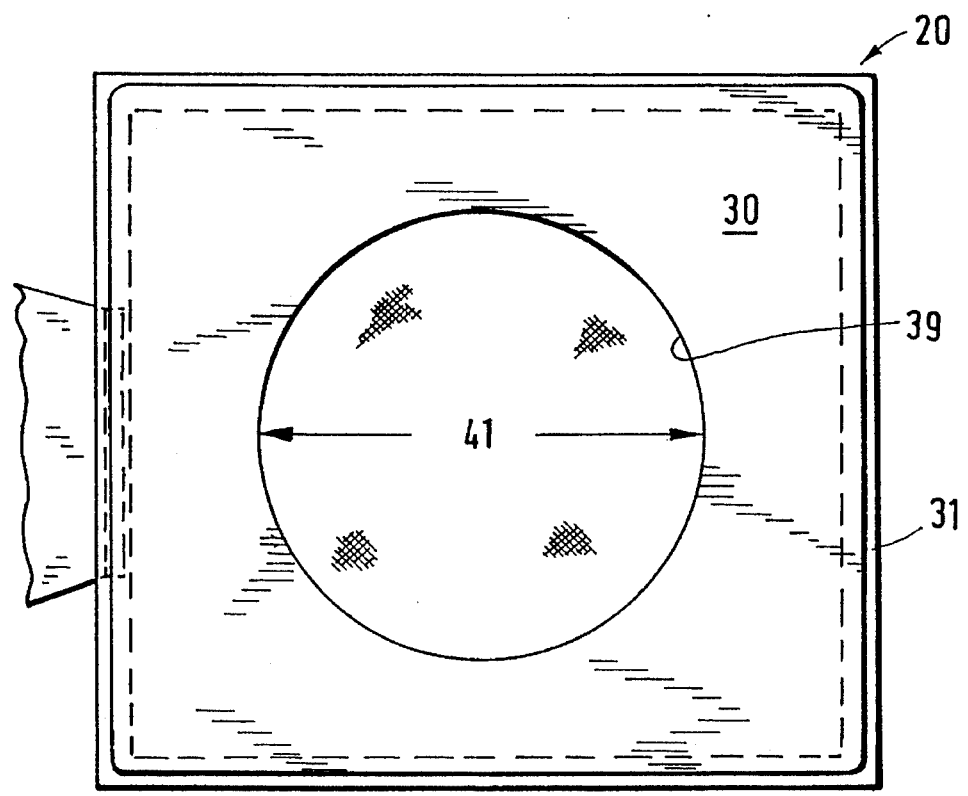
FIG. 10 is a view of the screen printing stencil shown in FIG. 9, viewing in the direction of the arrows X—X in FIG. 9.

FIGS. 9 and 10 show a screen printing arrangement as may be provided at the two screen printing stations III and XXIV. A screen printing stencil 30 is carried by a frame 31. It co-operates in the usual manner with a doctor 32 which is displaceable relative to the stationary screen printing stencil 30 and along same, in the case of the screen printing mechanisms 20 of the apparatus illustrated in the drawing.

In the screen printing process, it is generally appropriate if not even necessary to involve an arrangement in which the surface to be printed upon is aligned with the surrounding surfaces over which the printing doctor 32 also sweeps, so that the printing doctor 32 which is generally longer than the corresponding dimension of the article 15 can also bear against those adjacent surfaces. In order to achieve that, the invention also provides the possibility of disposing at the underside of the screen printing stencil 30, that is to say the side which is towards the article 15, an additional stencil or mask 37 which is mounted on the frame 31 and the thickness of which substantially corresponds to the dimension by which the article 15 projects at the top side relative to the holder 14 carrying that article. In other words, the thickness of that stencil 37 approximately corresponds to the difference in height 33 between the surface 25 of the article, that is to be printed upon, and the upward boundary face 96 of the holder 14, as shown in FIG. 9.

In the middle region the additional stencil 37 is provided with an opening or cut-out 39 which is matched to the dimensions of the article 15 and which in the specific case considered herein is therefore of a size corresponding to the outside diameter 41 of the article.

In FIG. 9 of the drawing the holder 14 with article 15 on the one hand and the screen printing stencil frame 31 with screen printing stencil 30 on the other hand are arranged at a certain spacing from each other, for the sake of enhanced clarity of the drawing. Normally however the arrangement will be such that the pressure applied by the doctor 32 is sufficient to put the screen printing stencil 30 into the position required for the printing operation. In that situation the article 15 is received by the opening in the additional stencil 37 disposed beneath the screen printing stencil 30, so that in the region of the entire screen printing stencil 30, there is a support surface for the doctor 32, which is composed of the surface 25 of the article 15 that is to be printed upon, and the additional stencil 37. In that case the latter is supported on the upward surface 96 of the holder 14.

In the absence of an article in one of the screen printing stations III and XXIV respectively, the doctor 32 is blocked in known manner so that no printing operation takes place.

Reference will be once again made at this stage to the FIG. 2 view in relation to the table 12. The table 12 has a particular form of guide arrangement comprising a round guide ring 97 which is mounted on the table 12 and which extends therearound and against the top and bottom sides of which bear respective rollers 99 which are arranged in pairs to guide the guide ring 97 and therewith the table, in a tolerance-free fashion. There is thus always a clearly defined reference plane, in regard to the position of the offset printing arrangement 24 and the printing cylinder 34 thereof relative to the surface 25 to be printed upon. In addition that guide arrangement guarantees that, in the course of the transportation movement, the position in respect of height of the surface 25 of an article 15 to be printed upon, which was detected in the testing station XVIII, does not alter during the transportation movement into the printing station XX.

For the purposes of establishing the measuring plane from which the printing arrangement 24 is adjusted upwardly or downwardly in dependence on the control pulses for the adjusting motor 52, which are supplied by the computing arrangement 21, the offset printing arrangement 24 can be adjusted into a respective predetermined position in respect of height by way of a central, possibly manually actuable fine adjustment means, in order in that way to establish the measuring plane which, from the sensor device 19 and also the sensor device 93 associated with the impression cylinder 84, serves as a zero line, relative to which the position in respect of height of the surface 25 to be printed upon of the respective article 15 and the position of the transfer surface 95a–d co-operating with the respective article 15 are defined. The position in respect of height which is assumed by the offset printing arrangement 24 during the printing operation is thus composed of two components, namely on the one hand the component which corresponds to the position as measured in station XVIII of the surface 25 to be printed upon, and that component which arises out of the configuration of the respective transfer surface 95a–d, while if that configuration is not coaxial relative to the axis of rotation of the printing cylinder 34 during the printing operation, that is to say while the respective transfer surface 95a–d rolls against the article 15, adaptive changes in position of the offset printing arrangement may possibly be required in order to compensate for the above-mentioned deviations from a coaxial relationship.

In order to satisfy the high levels of requirement which arise in this respect, the invention further affords the possibility of the respective actual position of the offset printing arrangement 24 and therewith the printing cylinder 34 being ascertained by way of a further sensor device 92 which is provided with a sensor or feeler member 104. That actual position value is passed by way of the line system 28 to the computing arrangement 21 where it is compared to a reference or target value. This therefore provides a control circuit which permits continual readjustment of the position of the offset printing mechanism.

An important advantage of the process and apparatus in accordance with the invention is that it is possible for the printing arrangement including all the inking mechanisms thereof to be caused to run continually in one direction although the transportation assembly associated with the printing arrangement for transporting the individual articles to be printed upon transports the articles in a cyclic fashion and thus discontinuously. The continual movement of the printing arrangement including all inking mechanisms is advantageous in terms of achieving high quality of the print images to be produced. The process and apparatus according to the invention permit the co-operation of a continually operating printing arrangement and a transportation assembly which operates in a stepwise manner, in such a way that it is possible to achieve optimum output, that is to say the optimum number of printed invidual articles 15 per unit of time, while affording excellent print image quality.

It will be seen therefore that the process and apparatus according to the invention make it possible for flat individual articles which are substantially inflexible or of low flexibility and whose extent perpendicularly to the surface to which the print image is applied is frequently substantially less than the extent of the surface to which the printing is to be applied to be provided with print images of high quality by means of an offset printing procedure, more specifically even when the thickness of the articles fluctuates for example due to the manner of manufacture involved, within a given range, for example around 200µ, which far exceeds the tolerances which are admissible in an offset printing process, for the size of ink dots to be transferred. It will further be noted in this respect that it is possible to retain the basic structural configuration of known machines for printing on CDs and similar articles.

It will be appreciated that the above-described process and apparatus according to the principles of the present invention have been set forth solely by way of example and illustration of the invention and that other modifications and alterations may be made therein without thereby departing from the spirit and scope of the invention.

What is claimed is:

1. A process for printing on individual articles which each have an at least substantially flat surface to be printed upon and whose extent perpendicularly to said substantially flat surface is generally relatively small, using at least an offset printing process effected by an offset printing arrangement including an offset printing cylinder having a periphery with at least one transfer means providing a transfer surface for transferring a print image on to a said article, comprising the steps of:

supporting each article by a holding means;

ascertaining the position of said surface of the article;

adjusting the offset printing arrangement and the article relative to each other so that said transfer surface transferring the print image on to the article of said at least one transfer means at the periphery of said rotating printing is brought into a favorable position for a printing operation relative to the article; and transferring the print image onto the surface of said article by performing an offset printing operation at an offset printing station, wherein in the offset printing operation, said article is held stationary and the printing cylinder is rolled against said article.

2. A process as set forth in claim 1 wherein the position of said surface of said article is ascertained by a sensor device operable to produce an output and further comprising the step of actuating an adjusting drive motor for adjusting the offset printing arrangement in accordance with the ascertained position of said surface of said article in response to said sensor output.

3. A process as set forth in claim 2 wherein said holding means has a support surface for carrying a said article and wherein the position of the support surface of the holding means is predetermined.

4. A process as set forth in claim 2 wherein the output of said sensor device is processed to ascertain the position of said surface in a computing means operable to control the adjusting drive motor.

5. A process as set forth in claim 1 further comprising the step of ascertaining a radial position of the transfer surface of the at least one transfer means and using the radial position information to position the printing cylinder relative to the article to which the print image is to be applied.

6. A process as set forth in claim 5 wherein the radial position of the transfer surface is ascertained by a sensor device operable to produce an output, the process further comprising the step of controlling an adjusting drive motor for adjusting the offset printing arrangement taking account of the position of said transfer surface relative to the ascertained position of said surface of the article using said sensor output.

7. A process as set forth in claim 6 wherein the output of said sensor device which ascertains the position of the at least one transfer surface is processed in a computing means operable to control the adjusting drive motor.

8. A process as set forth in claim 5 wherein in said ascertaining step for establishing the position of said at least one transfer surface, a movably mounted guide element is caused to bear against the transfer surface and the position of the at least one transfer surface in the peripheral direction of the printing cylinder in the course of a rotational movement thereof about its axis of rotation is detected by the guide element and by a sensor device operable to produce an output corresponding to said position.

9. A process as set forth in claim 8 wherein said output is stored.

10. A process as set forth in claim 8 wherein said guide element is in the form of an impression cylinder.

11. A process as set forth in claim 1 further comprising the step of transferring the at least one print image from at least one plate cylinder of the offset printing arrangement onto the transfer surface of the at least one transfer means;
    ascertaining a radial position of said transfer surface; and
    adjusting the at least one plate cylinder relative to the respective transfer surface of the at least one transfer means in dependence on rotary movement of the printing cylinder.

12. A process as set forth in claim 11 wherein the radial position of said transfer surface is ascertained by a sensor device operable to produce an output which is used in order if necessary in dependence on the rotary movement of the printing cylinder to control an adjusting drive adapted to adjust the at least one plate cylinder relative to the ascertained position of said transfer surface.

13. A process as set forth in claim 12 wherein the output of said sensor device which ascertains the position of the at least one transfer surface is processed in a computing means operable to control an adjusting drive motor for adjustment for the plate cylinder.

14. A process as set forth in claim 1 further comprising the step of carrying said holding means for the article with a transportation means, the transportation means adapted to transport the holding means with article along a transportation path into a position for execution of the printing operation and after execution thereof to transport the holding means out of said position.

15. A process as set forth in claim 14 wherein the printing cylinder with the at least one transfer means performs reciprocating movements and the printing operation step applying printing to the article is effected during one of said movements and during a return movement of the printing cylinder, the printed article is transported along the transportation path out of the printing station and another article is transported into the printing station for a following printing operation.

16. A process as set forth in claim 14 wherein in said ascertaining the position of said surface step, the position of said surface is ascertained in a testing station disposed upstream of the offset printing station in a direction of transportation of said articles.

17. A process as set forth in claim 1 wherein the at least one transfer means at the periphery of the printing cylinder extends in the peripheral direction only over at least a first portion of the periphery of the printing cylinder and wherein the overall diameter of the printing cylinder in the first portion is larger than in second portion without transfer means.

18. A process as set forth in claim 17, further comprising a transportation step of transporting a printed article along a transportation path out of the printing station and transporting another article into the printing station, wherein a division between said first portion of the periphery of the printing cylinder with said transfer means and said second portion of the periphery without transfer means is so selected and speeds of rotary movement and lateral displacement of the printing cylinder are so controlled that during the transportation step said second portion is disposed opposite the transportation path for the articles.

19. A process as set forth in claim 17 wherein the first and second portions of the transfer means are at a spacing from each other in the peripheral direction of the printing cylinder and each part of the transfer means receives a print image to be transferred on to the article.

20. A process as set forth in claim 1 further comprising the steps of:
    transporting the article out of the printing station along a transportation path with a transportation means after the termination of the printing operation; and
    moving the printing cylinder away from the printed surface of said article substantially perpendicularly to the configuration thereof in order to remove the transfer means from the region of movement of the article along the transportation path defined by transportation means.

21. A process as set forth in claim 1 wherein the articles are transported along a circular transportation path and the printing cylinder performs reciprocating movement substantially tangentially to the transportation path.

22. A process as set forth in claim 1 wherein in said ascertaining the position of said surface step, the position of said surface is ascertained in a testing station disposed upstream of the offset printing station in a direction of transportation of said articles.

23. A process as set forth in claim 1 wherein in the absence of a said article at said holding means in the offset printing station, a replacement article is moved into a position relative to the printing cylinder and the print image intended for the missing article is transferred from said transfer means on to said replacement article before the transfer surface of the transfer means, which has said print image, is provided with an application of ink.

24. A process as set forth in claim 23 wherein said replacement article is a web of material which is guided by way of at least one guide element which if necessary in the region of the printing cylinder is movable with a part of the web of material into a position in which when said article is absent the print image associated with said article is transferred from said transfer means of the printing cylinder on to the said part of the web of material.

25. A process as set forth in claim 24 wherein for the purposes of breaking in at least the offset printing arrangement and in test runs thereof the guide element for the web of material is movable during a plurality of successive printing operations into an operative position in which successive print images are transferred from said transfer means of the printing cylinder on to said web of material.

26. A process as set forth in claim 23 further comprising the step of checking the holding means for the presence of an article in a testing station for ascertaining the position of said surface to be printed upon.

27. A process as set forth in claim 1 further comprising the step of screen printing said surface of said article with a basic application of ink on to which said offset print image is printed, prior to said offset printing operation.

28. A process as set forth in claim 27 wherein the basic application of ink is white ink.

29. A process as set forth in claim 1 further comprising the step of screen printing a transparent protective layer onto the print image on the surface of said article.

30. Apparatus for printing a print image on individual articles which each have an at least substantially flat surface to be printed upon and whose extent perpendicularly to said substantially flat surface is generally relatively small, using at least an offset printing process, comprising:

at least one holding means for carrying an article;

an offset printing station having at least one offset printing arrangement including at least one plate cylinder and a rotatable offset printing cylinder having a periphery with at least one transfer means providing at least one transfer surface for the print image;

means for arranging a said article carried by the holding means on the one hand and said offset printing cylinder on the other hand adjustably relative to each other so that said at least one transfer surface for transfer of the print image on to the article is movable into a favorable position for performing a printing operation relative to said surface of the article in the offset printing station; and means for mounting the printing cylinder reciprocally in substantially parallel relationship with said surface for applying the print image to the article.

31. Apparatus as set forth in claim 30 wherein the means for arranging includes means for taking account of the position of said surface of said article.

32. Apparatus as set forth in claim 30 wherein the means for arranging includes means for taking account of the radial position of the at least one transfer surface of the printing cylinder.

33. Apparatus as set forth in claim 32 including a sensor device operatively associated with the offset printing arrangement for ascertaining the radial position of said at least one transfer surface of the printing cylinder.

34. Apparatus as set forth in claim 33 further comprising an adjusting motor operatively associated with the plate cylinder in order if necessary in dependence on rotary movement of the printing cylinder to adjust the position of the plate cylinder relative to the ascertained position of the transfer surface of the at least one transfer means.

35. Apparatus as set forth in claim 33 wherein said sensor device includes a roller, and means for mounting said roller movably between a first position in which said roller at least indirectly bears against the at least one transfer surface of the printing cylinder and a second position in which said roller is disposed at a spacing from a path of movement along which the transfer surface moves upon rotary movement of the printing cylinder.

36. Apparatus as set forth in claim 35 wherein said means for mounting said roller is a pivotably mounted lever.

37. Apparatus as set forth in claim 36 wherein said lever comprises a double-arm lever including a cam means and a cam roller mounted on the lever, the lever being co-operable with the cam means to hold said roller at a spacing from the periphery of the printing cylinder in portions of the periphery of the printing cylinder which do not have transfer means.

38. Apparatus as set forth in claim 36 further comprising an elastic means operatively associated with the roller for urging said roller in a direction towards the at least one transfer means of the at least one transfer means at the periphery of the printing cylinder.

39. Apparatus as set forth in claim 38 wherein said elastic means comprises a pneumatic piston-cylinder arrangement which is also actuatable in the opposite direction.

40. Apparatus as set forth in claim 30 wherein said means for ajustably arranging comprises means for adjustably arranging the offset printing arrangement in its entirety relative to a said article.

41. Apparatus as set forth in claim 30 including a sensor device adapted to ascertain the position of said surface of the article.

42. Apparatus as set forth in claim 41 further comprising a testing station disposed upstream of the offset printing station and wherein said sensor device adapted to ascertain the position of said surface of the article is arranged in said testing station.

43. Apparatus as set forth in claim 30 further comprising:

support means;

a carriage adapted to be reciprocatable on said support means in substantially parallel relationship to said surface of the article; and a frame which is mounted displaceably in respect of height on said carriage, said frame carrying said offset printing arrangement.

44. Apparatus as set forth in claim 43 further comprising:

means for mounting said frame pivotably in the carriage; and an adjusting drive means for pivoting the frame with the offset printing arrangement about a pivot axis.

45. Apparatus as set forth in claim 44 further comprising:

at least one adjusting roller carried by said frame; and at least one adjusting surface means which is inclined relative to the horizontal and on which said roller is supported, said adjusting surface means being displaceable by the adjusting drive means for adjusting the frame and the offset printing arrangement carried thereby.

46. Apparatus as set forth in claim 43 further comprising:

a second carriage which is mounted on the first carriage and which carries said adjusting surface means and which is displaceable by the said adjusting drive means for adjustment of the position of the offset printing arrangement transversely to the directions in which reciprocating movements of the first carriage occur.

47. Apparatus as set forth in claim 30 wherein the at least one transfer means at the periphery of the printing cylinder extends in the peripheral direction only over a first portion of the periphery of the printing cylinder, such that there is a second, remaining portion of the periphery of the printing cylinder over which the transfer means does not extend, wherein the diameter of the printing cylinder in the first portion is larger than in the second portion without transfer means.

48. Apparatus as set forth in claim 30 wherein the transfer means is subdivided into at least first and second parts and the individual parts of the transfer means are at a spacing from each other in the peripheral direction of the printing cylinder.

49. Apparatus as set forth in claim 30 further comprising:

a transportation path along which the individual articles are delivered to and removed from the printing station; and means for moving the printing arrangement away from the printed surface of the article after the termination of each printing operation substantially perpendicularly to the printed surface in order to remove said transfer means from a region of movement of the individual articles along the transportation path thereof.

50. Apparatus as set forth in claim 30 further comprising:

a transportation means for carrying said at least one holding means; and means for stepwise rotation of said transportation means in a horizontal plane, wherein the offset printing arrangement is arranged above the transportation means.

51. Apparatus as set forth in claim 50 wherein said transportation means comprises a table, a guide ring carried by said table and extending therearound, and guide rollers arranged at respective sides of said guide ring to guide same.

52. Apparatus as set forth in claim 50 further comprising a first screen printing station disposed upstream of the offset printing station.

53. Apparatus as set forth in claim 52 further comprising a second screen printing station arranged downstream of the offset printing station.

54. Apparatus as set forth in claim 30 further comprising:

a guide element in operative association with the offset printing arrangement and a web of material for receiving offset-printed print images; and means for mounting the guide element movably between a first position in which the portion of said web carried by the guide element is in contact with the at least one transfer surface of the printing cylinder and a second position in which the guide element with the web portion guided thereby is disposed at a spacing from the printing cylinder.

55. Apparatus as set forth in claim 54 wherein said guide element comprises a roller.

56. Apparatus as set forth in claim 30 further comprising:

a plurality of sensor devices generating a corresponding plurality of outputs;

a computing means which receives said outputs; and an adjusting drive motor actuated by said computing means in dependence on the outputs from the sensor devices, the adjusting drive motor being operable to control the position of said transfer surface of the printing cylinder relative to said surface of the individual article.

57. Apparatus as set forth in claim 30 further comprising:

a transportation path along which said articles are transported in the holding means; and means for mounting the offset printing arrangement reciprocatably substantially tangentially relative to the transportation path.

58. Apparatus as set forth in claim 30 further comprising:

a transportation path along which said articles are transported; and means for mounting the offset printing arrangement reciprocatably perpendicularly to the transportation path.

59. A process for printing on individual articles which each have a substantially flat surface to be printed upon and whose extent perpendicularly to said substantially flat surface is generally relatively small, using an offset printing process effected by an offset printing arrangement including an offset printing cylinder having a periphery with at least one transfer means providing a transfer surface for transferring a print image on to a said article, comprising the steps of:

supporting each article by a holding device;

ascertaining whether an article is supported by the holding device with a sensor device;

transferring the print image onto the surface of said article by performing an offset printing operation at an offset printing station in response to the sensor device detecting the presence of a said article supported by the holding device; and moving a replacement article into a position relative to the printing cylinder in response to the sensor device detecting the absence of a said article supported by the holding device and transferring the print image intended for the absent article from said transfer means on to said replacement article.

60. The process according to claim 59 wherein the replacement article comprises a web of material.

61. An apparatus for printing a print image on individual articles which each have a substantially flat surface to be printed upon and whose extent perpendicularly to said substantially flat surface is generally relatively small, using an offset printing process, comprising:

at least one holding device for transporting one of said individual articles along a transportation path;

an offset printing station having an offset printing arrangement including at least one plate cylinder and a rotatable offset printing cylinder having a periphery with at least one transfer means providing at least one transfer surface for the print image, the holding device transporting one of said articles to the printing station;

a sensor device for detecting the absence of an article carried by the holding device upstream from the printing station;

means for arranging said article carried by the holding device and said offset printing cylinder adjustably relative to each other so that said at least one transfer surface for transfer of the print image on to the article is movable into a position for performing a printing operation; and means for moving a replacement article into a position relative to the printing cylinder in response to the sensor device detecting the absence of a said article supported by the holding device, wherein the print image intended for the absent article is transferred from said transfer means on to said replacement article.

62. The apparatus of claim 61 wherein the replacement article comprises a web of material.

* * * * *